(12) United States Patent
Zhang et al.

(10) Patent No.: US 12,189,043 B2
(45) Date of Patent: Jan. 7, 2025

(54) DETECTING SPOOFED GLOBAL NAVIGATION SATELLITE SYSTEM (GNSS) SIGNALS

(71) Applicant: QUALCOMM Incorporated, San Diego, CA (US)

(72) Inventors: Han Zhang, Beijing (CN); Ning Luo, Cupertino, CA (US); Gengsheng Zhang, Cupertino, CA (US); Bo Zheng, Sunnyvale, CA (US); Yinghua Yang, San Jose, CA (US); Min Wang, Tustin, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/534,325

(22) Filed: Dec. 8, 2023

(65) Prior Publication Data

US 2024/0134059 A1    Apr. 25, 2024

Related U.S. Application Data

(62) Division of application No. 17/238,730, filed on Apr. 23, 2021, now Pat. No. 11,892,545.

(51) Int. Cl.
*G01S 19/21* (2010.01)
*G08B 21/18* (2006.01)

(52) U.S. Cl.
CPC ............ *G01S 19/215* (2013.01); *G08B 21/18* (2013.01)

(58) Field of Classification Search
CPC .............................................. G01S 19/21–215
See application file for complete search history.

(56) References Cited

U.S. PATENT DOCUMENTS

| | | | |
|---|---|---|---|
| 7,512,492 B2 | 3/2009 | Irvin et al. | |
| 9,363,642 B2 | 6/2016 | Fischer et al. | |
| 10,281,583 B2 | 5/2019 | Leibner et al. | |
| 2016/0124092 A1 | 5/2016 | McDonald et al. | |
| 2017/0070971 A1 | 3/2017 | Wietfeldt et al. | |
| 2019/0041223 A1* | 2/2019 | Yang | G01C 21/30 |
| 2019/0154839 A1 | 5/2019 | Ashjaee | |
| 2019/0302272 A1 | 10/2019 | Balog et al. | |
| 2021/0341626 A1* | 11/2021 | Elam | G01S 19/215 |
| 2022/0342082 A1 | 10/2022 | Zhang | |

(Continued)

OTHER PUBLICATIONS

International Search Report and Written Opinion—PCT/US2022/070976—ISA/EPO—Aug. 9, 2022.

(Continued)

*Primary Examiner* — Cassi J Galt
(74) *Attorney, Agent, or Firm* — Thien T. Nguyen

(57) ABSTRACT

In an aspect, a user equipment (UE) receives a spoofing alert message from either a server or an internet-of-things (IOT) device that indicates whether a spoofed Global Navigation Satellite System (GNSS) condition is present. Based on determining that the spoofing alert message indicates that a spoofed GNSS condition is present, the UE determines, based on the spoofing alert message, a location of a spoofer broadcasting a spoofed GNSS signal, determines, based on the location of the spoofer and a current location of the UE, that the UE is within a receiving area of the spoofed GNSS signal, and determines a position of the UE without using the spoofed GNSS signal.

20 Claims, 11 Drawing Sheets

(56) References Cited

U.S. PATENT DOCUMENTS

2024/0111061 A1    4/2024  Zhang et al.

OTHER PUBLICATIONS

Partial International Search Report—PCT/US2022/070976—ISA/EPO—Jun. 14, 2022.
Wu Z., et al., "Spoofing and Anti-Spoofing Technologies of Global Navigation Satellite System: A Survey", IEEE Access, IEEE, USA, vol. 8, Sep. 7, 2020, p. 165444-165496, XP011809795, DOI: 10.1109/ACCESS.2020.3022294, [Retrieved on Sep. 17, 2020] the whole document.

* cited by examiner

DETECTING SPOOFED GLOBAL NAVIGATION SATELLITE SYSTEM (GNSS) SIGNALS

CROSS-REFERENCE TO RELATED APPLICATIONS

The present Application for patent is a Divisional of U.S. Non-Provisional application Ser. No. 17/238,730, entitled "DETECTING SPOOFED GLOBAL NAVIGATION SATELLITE SYSTEM (GNSS) SIGNALS," filed Apr. 23, 2021, which is assigned to the assignee hereof and is expressly incorporated herein by reference in its entirety.

BACKGROUND OF THE DISCLOSURE

1. Field of the Disclosure

Aspects of this disclosure relate generally to a Global Navigation Satellite System (GNSS), and particularly to detecting spoofed GNSS signals.

2. Description of the Related Art

A satellite navigation system is a system that uses satellites to provide autonomous geo-spatial positioning. Such a system enables electronic receivers to determine a location (longitude, latitude, and altitude) with a high degree of accuracy (e.g., typically within a few centimeters to a few meters) using radio frequency (RF) signals transmitted along a line of sight from satellites. A satellite navigation system with global coverage is referred to as a Global Navigation Satellite System (GNSS).

Reliable navigation is critical for public safety. GNSS signals used for navigation can be spoofed, thereby causing navigation issues and potentially disastrous consequences for users. Spoofing refers to broadcasting false ("spoofed") GNSS signals with the intent that a receiver will misinterpret the spoofed signals as authentic signals, thereby causing the receiver to determine a false position fix. Such spoofing can, for example, be used to cause a drone to go into a dive, steer a yacht off course, and the like. Thus, spoofing GNSS signals can induce dangerous behavior from receivers that trust the spoofed signals. Current techniques for detecting spoofed GNSS signals are unreliable and unable to distinguish between spoofing and a bad (e.g., noisy) environment.

SUMMARY

The following presents a simplified summary relating to one or more aspects disclosed herein. As such, the following summary should not be considered an extensive overview relating to all contemplated aspects, nor should the following summary be regarded to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In a first aspect, a method of operating a server includes receiving a warning message from a monitored device in a set of monitored devices. The warning message includes Global Navigation Satellite System (GNSS) measurement data. The method includes determining, based at least in part on an analysis of the GNSS measurement data, whether a spoofed GNSS condition is present. Based on the determining, the method includes sending a spoofing alert message to one or more user equipments (UEs).

In a second aspect, a method of operating a device includes measuring one or more Global Navigation Satellite System (GNSS) signals to obtain GNSS measurement data, determining that one or more GNSS spoofing criteria associated with the GNSS measurement data are satisfied, and transmitting, to a server, a warning message associated with the GNSS measurement data to alert the server to potential GNSS spoofing.

In a third aspect, a method of operating a user equipment includes receiving a spoofing alert message comprising an indication that a spoofed Global Navigation Satellite System (GNSS) condition is present, a location of a spoofer broadcasting a spoofed GNSS signal, and an indication of a spoofed zone. The method includes determining that the spoofing alert message indicates that a spoofed GNSS condition is present. The method includes determining, based on the spoofing alert message, a location of a spoofer broadcasting a spoofed GNSS signal. The method includes determining, based on the location of the spoofer and a current location of the user equipment, that the user equipment is within a receiving area of the spoofed GNSS signal. The method includes determining a position of the user equipment without using the spoofed GNSS signal.

In a fourth aspect, a device includes memory and one or more processors communicatively coupled to the memory. The one or more processors are configured to measure one or more Global Navigation Satellite System (GNSS) signals to obtain GNSS measurement data, determine that one or more GNSS spoofing criteria associated with the GNSS measurement data are satisfied, and transmit, to a server, a warning message associated with the GNSS measurement data to alert the server to potential GNSS spoofing.

In a fifth aspect, a server includes memory and one or more processors communicatively coupled to the memory. The one or more processors are configured to receive a warning message from a monitored device in a set of monitored devices. The warning message comprises Global Navigation Satellite System (GNSS) measurement data. The one or more processors are configured to determine, based at least in part on an analysis of the GNSS measurement data, whether a spoofed GNSS condition is present and to send a spoofing alert message to one or more user equipments (UEs) based on the determining.

In a sixth aspect, a user equipment includes a wireless transceiver, a Global Navigation Satellite System (GNSS) receiver, and one or more processors. The one or more processors are communicatively connected to the wireless transceiver and the GNSS receiver. The one or more processors are configured to receive a spoofing alert message comprising an indication that indicates whether a spoofed Global Navigation Satellite System (GNSS) condition is present, a location of a spoofer broadcasting a spoofed GNSS signal, and an indication of a spoofed zone. The one or more processors are configured to determine that the spoofing alert message indicates that a spoofed GNSS condition is present. The one or more processors are configured to determine, based on the spoofing alert message, a location of the spoofer broadcasting the spoofed GNSS signal. The one or more processors are configured to determine, based on the location of the spoofer and a current location of the user equipment, that the user equipment is within a receiving area of the spoofed GNSS signal. The one or more processors are configured to determine a position of the user equipment without using the spoofed GNSS signal.

In a seventh aspect, a non-transitory computer-readable storage media stores instructions executable by one or more processors to receive a warning message from a monitored device in a set of monitored devices. The warning message includes Global Navigation Satellite System (GNSS) measurement data. The instructions are executable by the one or more processors to determine, based at least in part on an analysis of the GNSS measurement data, whether a spoofed GNSS condition is present. Based on the determining, the instructions are executable to send a spoofing alert message to one or more user equipments (UEs).

In an eighth aspect, a non-transitory computer-readable storage media stores instructions executable by one or more processors to measure one or more Global Navigation Satellite System (GNSS) signals to obtain GNSS measurement data, determine that one or more GNSS spoofing criteria associated with the GNSS measurement data are satisfied, and transmit, to a server, a warning message associated with the GNSS measurement data to alert the server to potential GNSS spoofing.

In a ninth aspect, a non-transitory computer-readable storage media stores instructions executable by one or more processors to receive a spoofing alert message comprising an indication that a spoofed Global Navigation Satellite System (GNSS) condition is present, a location of a spoofer broadcasting a spoofed GNSS signal, and an indication of a spoofed zone. The instructions are further executable by the one or more processors to determine that the spoofing alert message indicates that a spoofed GNSS condition is present. The instructions are further executable by the one or more processors to determine, based on the spoofing alert message, a location of a spoofer broadcasting a spoofed GNSS signal. The instructions are further executable by the one or more processors to determine, based on the location of the spoofer and a current location of the user equipment, that the user equipment is within a receiving area of the spoofed GNSS signal. The instructions are further executable by the one or more processors to determine a position of the user equipment without using the spoofed GNSS signal.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof. A more complete understanding of the present disclosure may be obtained by reference to the following Detailed Description when taken in conjunction with the accompanying Drawings. In the figures, the left-most digit(s) of a reference number identifies the figure in which the reference number first appears. The same reference numbers in different figures indicate similar or identical items.

DETAILED DESCRIPTION

Figure 1:
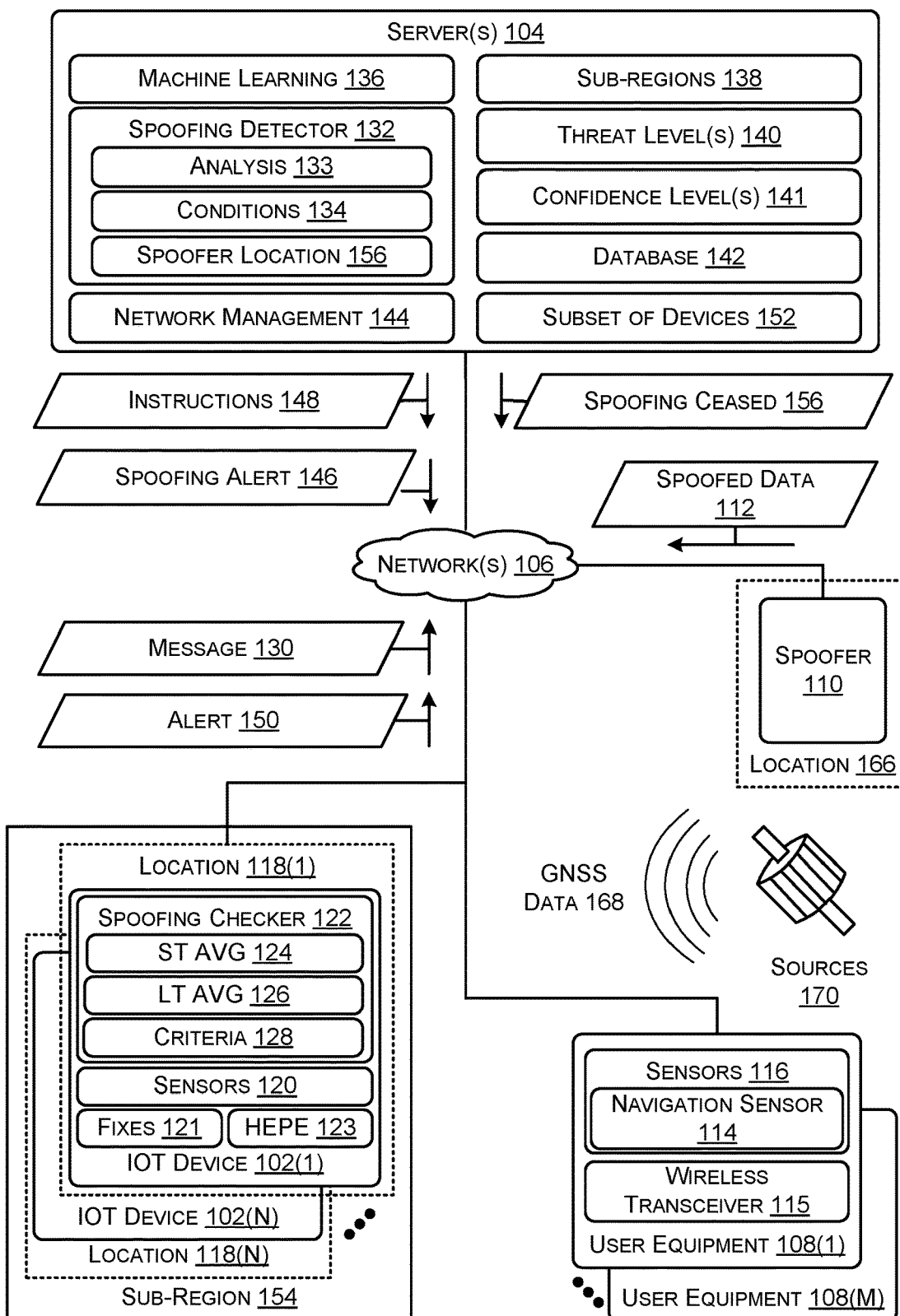
FIG. 1 illustrates an example of a system to detect spoofed GNSS data, according to various aspects of the disclosure.

Disclosed are systems and techniques for detecting GNSS data spoofing using static Internet of things (IOT) devices. For example, static IOT devices embedded in locations such as, traffic lights, lamp posts, security cameras, and the like are used to determine if spoofed GNSS data is being transmitted. Individual static IOT devices in a network perform a comparison of a long-term average of GNSS fixes and a short-term average of GNSS fixes. The short-term average of GNSS fixes is an average of the number of fixes determined in a relatively short period of time, such as, for example, between about 10 seconds to about 60 seconds. In some aspects, the short-term average of GNSS fixes may be determined over a time period of about 20 seconds. The long-term average of GNSS fixes is the number of fixes determined in a relatively long period of time, such as, for example, 1 day to 30 days. In some aspects, the long-term average of GNSS fixes may be determined over a time period of about 7 days. The short-term average and the long-term average are used merely as examples. It should be understood that other techniques, such as determining a median, determining a statistical center, or the like of the fixes over a period of time may be used instead of determining an average.

For example, if the difference between the long-term average of GNSS fixes and the short-term average of GNSS fixes satisfies a particular threshold, then the static IOT device determines that the static IOT device may have received spoofed GNSS data and sends an alert message, including the short-term average of GNSS fixes, the long-term average of GNSS fixes, the difference between the long-term and short-term averages of GNSS fixes, and the HEPE to a server. The server stores (e.g., in a database) the data received from the IOT devices, thereby enabling the server to use the long-term average of GNSS fixes as a reference to determine whether the GNSS data is being spoofed.

The server serves a particular geographic region (e.g., a portion of a city, one or more cities, one or more counties, one or more states, one or more countries, or another geographic delineation). The server gathers data from multiple IOT devices located in the particular geographic region ("region") to determine whether GNSS data is being spoofed. The server may perform an analysis of the alert messages received from multiple IOT devices, such as, for example, a location of individual IOT devices, how long individual IOT devices have been sending the alert message, a movement pattern of individual IOT devices, and the like. To illustrate, the server may determine whether positions jumps are similar (e.g., due to spoofed ephemerides) or whether multiple positions jump to a same location (meaconing). In navigation, an ephemeris (plural is ephemerides) gives the trajectory of satellites in the sky, e.g., the position and, in some cases, velocity) over time. Meaconing is the interception and rebroadcast of navigation signals. The navigation signals are rebroadcast on the received frequency, typically at a power level that is higher than the original signals. The server may, in some cases, use machine learning, such as a support vector machine or other classifier, to predict (e.g., based on the alert messages) whether spoofed GNSS data (e.g., one or more GNSS signals) is being transmitted in the region.

If the server determines based on the analysis of the alert messages that, e.g., GNSS spoofing is occurring (e.g., spoofed data is being broadcast), then the server sends information about the spoofing to user equipment (UE) devices (and to IOT devices) in in the region. By analyzing alert messages from multiple IOT devices, the server can determine a location of the spoofer. Because the server gathers data from multiple IOT devices, the systems and techniques described herein provide much greater reliability as compared to other ways of detecting spoofing. Additional advantages include self-learning based on historical data, not using external assistance, not using pre-survey, using existing infrastructure, low cost, wide coverage, and the like. Furthermore, the systems and techniques described herein can be used using single point positioning (SPP), e.g., without using accuracy improvements used to increase the accuracy of positioning derived from GNSS, such as real-time kinematic (RTK) positioning, Precise Point Positioning (PPP), and the like. However, if an accuracy improvement, such as RTK, PPP, or the like is available, then the systems and techniques described herein can take advantage of those to increase the accuracy of the spoofing analysis.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "example" and/or "example" are used herein to mean "serving as an example, instance, or illustration." Any aspect described herein as "example" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular radio access technology (RAT), unless otherwise noted. In general, a UE may be any wireless communication device (e.g., a mobile phone, router, tablet computer, laptop computer, consumer asset tracking device, wearable device (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile device," a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on Institute of Electrical and Electronics Engineers (IEEE) 802.11, etc.) and so on.

A base station may operate according to one of several RATs in communication with UEs depending on the network in which it is deployed, and may be alternatively referred to as an access point (AP), a network node, a NodeB, an evolved NodeB (eNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems a base station may provide purely edge node signaling functions while in other systems it may provide additional control and/or network management functions. A communication link through which UEs can send RF signals to a base station is called an uplink (UL) channel (e.g., a reverse traffic channel, a reverse control channel, an access channel, etc.). A communication link through which the base station can send RF signals to UEs is called a downlink (DL) or forward link channel (e.g., a paging channel, a control channel, a broadcast channel, a forward traffic channel, etc.). As used herein the term traffic channel (TCH) can refer to either an uplink/reverse or downlink/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell (or several cell sectors) of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference RF signals (or simply "reference signals") the UE is measuring. Because a TRP is the point from which a base station transmits and receives wireless signals, as used herein, references to transmission from or reception at a base station are to be understood as referring to a particular TRP of the base station.

In some implementations that support positioning of UEs, a base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal," a "radar signal," a "radio wave," a "waveform," or the like, or simply a "signal" where it is clear from the context that the term "signal" refers to a wireless signal or an RF signal.

As a first example, a device (e.g., an internet-of-things (IOT) device) measures a Global Navigation Satellite System (GNSS) signal to obtain GNSS measurement data, determines that one or more GNSS spoofing criteria associated with the GNSS measurement data are satisfied, and transmits, to a server, a warning message associated with the GNSS measurement data to alert the server to potential GNSS spoofing. For example, the device may determine that one or more GNSS spoofing criteria associated with the GNSS measurement data are satisfied by determining a current GNSS fix based on the GNSS signal, updating GNSS fix data to include the current GNSS fix, determining, based on the GNSS fix data, a short-term average of GNSS fixes, determining, based on the GNSS fix data, a long-term average of GNSS fixes, determining a difference between the short-term average of GNSS fixes and the long-term average of GNSS fixes, determining that the difference satisfies a first threshold for at least a particular duration, determining, based on the current GNSS fix, a horizontal estimated position error (HEPE), and determining that the HEPE satisfies a second threshold for at least the particular duration. The short-term average of GNSS fixes is determined for a time period of between 10 seconds to 60 seconds, and in some aspects preferably 20 seconds. The long-term average of GNSS fixes is determined for a time period of between 1 day to 30 days, and in some aspects preferably one week. The device may receive a spoofing alert message from the server indicating a presence of a spoofed GNSS signal. The spoofing alert message includes at least one of: (1) one or more frequencies associated with a spoofed signal or (2) one or more constellations associated with the spoofed signal. The device may ignore the spoofed GNSS signal. The device may determine that one or more user equipments (UEs) are receiving the spoofed GNSS signal and send the spoofing alert message to at least one UE of the one or more UEs. The device may, in some cases (e.g., if the server determines that the device may be defective) receive an instruction from the server to perform at least one of: take offline a particular sensor associated with the device, stop sending the warning message to the server, or place the device in a low power mode (e.g., standby or powered off).

As a second example, a server receives a warning message from a monitored device in a set of monitored devices (e.g., monitored IOT devices). The warning message includes Global Navigation Satellite System (GNSS) measurement data. The server determines, based at least in part on an analysis of the GNSS measurement data, whether a spoofed GNSS condition is present and, based on the determining, sends a spoofing alert message to one or more user equipments (UEs). Where the server determines the spoofed GNSS condition to be absent, the spoofing alert message provides an indication that the spoofed GNSS condition is not present. Where the server determines the spoofed GNSS condition to be present, the spoofing alert message provides an indication that the spoofed GNSS condition is present. Determining that the spoofed GNSS condition is present includes: determining that a number of monitored devices sending the warning message is greater than a number threshold, determining that a percentage of the number of monitored devices sending the warning message to a total number of monitored devices is greater than a percentage threshold, determining that a size of a sub-region in which monitored devices are sending the warning message is greater than a size threshold, and determining that a length of time during which monitored devices are sending the warning message is greater than a time threshold. The spoofing alert message includes: a spoofed constellation used by a spoofed GNSS signal, a frequency used by a spoofed GNSS signal, or both. Determining that the spoofed GNSS condition is absent includes: determining that a difference between a short-term average of GNSS fixes and a long-term average of GNSS fixes is less than a difference threshold for at least a percentage of the monitored devices. The server creates the set of monitored devices by determining that the spoofed GNSS condition is absent and if for a particular device of a plurality of devices: a difference between a short-term average of a first plurality of Global Navigation Satellite System fixes and a long-term average of a second plurality of Global Navigation Satellite System fixes is less than or equal to a difference threshold and a horizontal estimated position error is less than or equal to an error threshold, then the server includes the particular device in the set of monitored devices. The warning message received from the monitored device includes: a short-term average of a first plurality of GNSS fixes determined by the monitored device, a long-term average of a second plurality of GNSS fixes determined by the monitored device, a difference between the short-term average and the long-term average, and a horizontal estimated position error (HEPE) determined by the monitored device. The server may receive a second warning message from a second monitored device in the set of monitored devices. The second warning message includes second GNSS measurement data. If the server determines, based at least in part on the second GNSS measurement data, that the second monitored device is defective, then the server removes the second monitored device from the set of monitored devices. The server sends an instruction to the second monitored device. For example, the instruction may include a first instruction to disable a navigation sensor of the second monitored device, a second instruction to transition the second monitored device to a low-power mode, or both. 10. The method of claim 1, further comprising: determining a weighted average of a long-term average of GNSS fixes determined by monitored devices sending the warning message, wherein a weight for each device is based on a difference between: a short-term average of GNSS fixes determined by monitored devices sending the warning message, and a long-term average of GNSS fixes determined by monitored devices sending the warning message, and determining, based on the weighted average, an approximate location of a spoofer that is transmitting the spoofed GNSS signal.

As a third example, a user equipment (UE) receives a spoofing alert message that indicates whether a spoofed Global Navigation Satellite System (GNSS) condition is present. If the UE determines that the spoofing alert message indicates that a spoofed GNSS condition is present, the UE determines, based on the spoofing alert message, a location of a spoofer broadcasting a spoofed GNSS signal, determines, based on the location of the spoofer and a current location of the user equipment, that the user equipment is within a receiving area (e.g., spoofed zone) of the spoofed GNSS signal, and determines a position of the user equipment without using the spoofed GNSS signal. For example, the spoofing alert message includes: one or more constellations associated with the spoofed GNSS signal, one or more frequencies associated with the spoofed GNSS signal, or both. The user equipment may determining the position of the user equipment without using the spoofed GNSS signal by: retrieving a previously determined position (e.g., that was determined before receiving the spoofing alert message), determining sensor data from one or more sensors (e.g., a magnetometer, a gyroscope, an accelerometer, and the like) of the user equipment, and determining a current position of the user equipment based at least in part on the previously determined position and the sensor data. Based on determining that the spoofing alert message indicates that a spoofed GNSS condition is absent, the user equipment determines a position of the user equipment using a GNSS signal.

FIG. 1 illustrates an example of a system 100 to detect spoofed GNSS data, according to various aspects of the disclosure. The system 100 may include multiple Internet of things (IOT) devices 102(1) to 102(N) (N>0) connected to one or more servers 104 via one or more networks 106. Multiple user equipment (UE) 108(1) to 108(M) (M>0) may be connected to the network 106 and may include user devices, such as, for example, smart phones, smart watches, vehicles, and other devices that are capable of receiving global navigation satellite system (GNSS) data 168 (e.g., transmitted by GNSS signal sources 170) and determining a position fix (e.g., latitude, longitude, altitude) based on the GNSS data 168. Each UE 108 may include multiple sensors 116, including a navigation sensor 114 (e.g., a GNSS receiver or the like) and a wireless transceiver 115.

A spoofer 110 may transmit spoofed data 112 to mislead the navigation sensor 114 (e.g., GNSS receiver) that is part of the multiple sensors 116 included in each of the UE 108. The spoofed data 112 may cause receivers, such as the IOT devices 102 and the UEs 108, to determine an incorrect fix.

Each of the IOT devices 102 may have an associated location. For example, in FIG. 1, the IOT device 102(1) has an associated location 118(1) and the IOT device 102(N) has an associated location 118(N). Each of the locations 118 may be different from each other. At least a portion of the IOT devices 102 may be at fixed (e.g., stationary) locations 118. For example, at least some of the IOT devices 102 may be co-located with a lamp post, a traffic light, a security camera, or another type of stationary object. The user equipment 108 may include user devices, such as, for example, smart phones, smart watches, vehicles, and other devices that are typically not stationary and may be moving from one location to another location.

Each of the IOT devices 102 include multiple sensors 120, including a navigation sensor to receive GNSS data 168 to determine a current fix. In some cases, an inertial measurement unit (IMU) and a camera may be included in the multiple sensors 120 to enable individual IOT devices 102 and the server 104 to determine that individual IOT devices are static. Each of the IOT devices 102 may store fixes 121 that include the current fix and previously determined fixes. Each of the IOT devices 102 include a spoofing checker 122 that performs various calculations (e.g., as described herein) based on the fixes 121. For example, the spoofing checker 122, at a particular time interval, determines (e.g., using the fixes 121) a short-term average ("ST AVG") 124 of GNSS fixes, a long-term average ("LT AVG") 126 of GNSS fixes, and determines a difference in distance between the short-term average 124 and the long-term average 126. Each of the IOT devices 102 may determine a horizontal estimated position error (HEPE)123. The short-term average 124 of GNSS fixes is an average of the number of fixes determined in a relatively short period of time, such as, for example, between about 10 seconds to about 60 seconds. In some aspects, the short-term average of GNSS fixes may be determined over a time period of about 20 seconds. The long-term average 126 of GNSS fixes is the number of fixes determined in a relatively long period of time, such as, for example, 1 day to 30 days. In some aspects, the long-term average of GNSS fixes may be determined over a time period of about 7 days. The short-term average 124 and the long-term average 126 are used merely as examples. It should be understood that other techniques, such as determining a median, determining a statistical center, or the like of the fixes over a period of time may be used instead of determining an average.

Each of the IOT devices 102 determine if criteria 128, including the difference in distance between the short-term average 124 and the long-term average 126, are satisfied. For example, if the IOT device 102(1) determines that the criteria 128 are satisfied, then the IOT device 102(1) may send a message 130 (e.g., a warning message) to the server 104 indicating that the IOT device 102(1) suspects that spoofing is occurring. For example, the criteria 128 may specify that if the IOT device 102(1) determines that (1) the difference in distance between the short-term average 124 and the long-term average 126 satisfies a first threshold (2) the difference in distance divided by the HEPE 123 satisfies a second threshold, and (3) the conditions (1) and (2) are both satisfied for at least a particular duration (e.g., a third threshold), then spoofing may be occurring. In response to determining that the criteria 128 have been satisfied, the IOT device 102(1) sends the message 130 to the server 104, warning the server 104 that spoofing may be occurring.

If one or more of the IOT devices 102 use real-time kinematic (RTK) positioning, Precise Point Positioning (PPP), or another technique to increase positioning accuracy, then the increased accuracy provided by these may be used to increase the accuracy of the spoofing detection. In some cases, the GNSS data 168 received by individual IOT devices 102 may be cross-checked with positioning data from a reliable source. For example, ephemerides may be downloaded directly from a GNSS control center rather than decoding the ephemerides over-the-air (OTA).

The message 130 may include data, such as, for example, an identifier that uniquely identifies the IOT device sending the message 130, the short-term average 124, the long-term average 126, additional data associated with the IOT device sending the message 130, or any combination thereof. The identifier may be a device number, a serial number, a media access control (MAC) address, an Internet protocol (IP) address, a service tag, or another type of identifier that uniquely identifies the sender, such as the IOT device 102(1).

The server 104 serves a particular geographic region (e.g., a portion of a city, one or more cities, one or more counties, one or more states, one or more countries, or another geographic delineation). The particular geographic region includes the IOT devices 102 and the user equipment 108. The server 104 may or may not be physically located in the particular geographic region. When the spoofed data 112 is being broadcast, the server 104 may receive the message 130 from each of multiple IOT devices 102 that are within a reception area (e.g., sub-region 154) of the spoofed data 112. The reception area of the spoofed data 112 is also referred to as a spoofed zone. The number of IOT devices 102 that receive the spoofed data 112 may vary based on a signal strength associated with a broadcast of the spoofed data 112, which of the IOT devices 102 are in the line of sight of the spoofer 110, and other factors related to the broadcast of the spoofed data 112.

When no spoofing is present, the server 104 may determine a subset of devices 152, e.g., a subset of the IOT devices 102 that are behaving normally, e.g., the difference between the averages 124, 126 is below a first threshold and the HEPE is below a second threshold. In addition, in some cases, the server 104 may select a portion of the IOT devices 102 that are stationary (e.g., fixed) for inclusion in the subset of devices 152 and exclude a remainder of the IOT devices 102 that are not stationary (e.g., that may move). The server 104 may use the messages 130 sent by IOT devices in the subset of devices 152 to determine whether spoofing is present and may ignore the messages 130 sent by IOT devices not included in the subset of devices 152 for the calculations performed to determine whether spoofing is occurring.

The server 104 may receive multiple ones of the message 130 and use a spoofing detector 132 to analyze, e.g., at a particular time interval, based on a number of the messages 130 received, and other factors, the data included in multiple messages 130 to determine whether GNSS signal spoofing is occurring. The server 104 may perform an analysis using the analysis module 133 (e.g., described herein) to determine if conditions 134 have been satisfied. For example, the server 104 may determine if the number of IOT devices 102 in the subset is greater than a first threshold, the ratio (or percentage) of IOT devices 102 sending the message 130 relative to the total number of IOT devices 102 is greater than a second threshold, and whether a size of the sub-region 154 in which the subset of the IOT devices 102 are located is greater than a size threshold, and the subset of the IOT devices 102 have been sending the message 130 for at least a particular duration (e.g., a particular period of time). If the spoofing detector 132 determines that the conditions 134 have been satisfied then the spoofing detector 132 determines that spoofing is occurring. In some cases, the spoofing detector 132 may use machine learning 136, to predict whether spoofing is occurring based on the data received in the multiple ones of the message 130. For example, the machine learning 136 may include a classifier, such as, a support vector machine, to predict whether the data indicates spoofing is occurring.

If the server 104 determines that spoofing is occurring, the server 104 may, in some cases, send instructions to activate additional ones of the IOT devices 102. For example, when spoofing is absent, a majority (e.g., greater than 50%) of the IOT devices 102 may be in a low-power mode (e.g., idle, hibernating, or the like). The remainder of the IOT devices 102 may be in an active mode, e.g., performing calculations to determine whether spoofing is occurring. When the server 104 receives the message 130 from individual devices in the subset of devices 152, the server 104 may send instructions that instruct additional IOT devices 102 to transition from the low-power mode to the active mode. In this way, the server 104 receives additional data (e.g., the short-term average 124, the long-term average 126, the HEPE 123, and other data) in the messages 130 from the additional IOT devices 102. The server 104 may use the additional data to determine a spoofer location 166 of the spoofer 110, as described herein.

If the spoofing detector 132 determines that spoofing is occurring, then the spoofing detector 132 may identify one or more sub-regions 138 that includes a spoofer location 166 of the spoofer 110 and a size of each of the sub-regions 138. For example, the server 104 may determine the locations 118 of the IOT devices 102 that are sending the message 130 to determine the sub-regions 138 affected by spoofing. The spoofing detector 132 may determine threat levels 140 and confidence levels 141 associated with the spoofing. For example, the spoofing detector 132 may determine that spoofing is occurring in a particular sub-region (e.g., the sub-region 154) of the sub-regions 138 with a particular percentage of confidence (e.g., confidence levels 141) based on the number of IOT devices 102 sending the message 130 and based on the ratio of the number of IOT devices 102 sending the message 130 to the subset of devices 152. The spoofing detector 132 may determine the threat levels 140 based on the data in the message 130, such as, for example the difference between the averages 124, 126, the HEPE, and other data. The threat level 140 of the spoofed data 112 may be higher for one or more of the user equipment 108 if the spoofer 110 is closer to one or more of the user equipment 108 and lower if the spoofer 110 is further away (e.g., greater than a threshold distance) from one or more of the user equipment 108.

The spoofing detector 132 may determine a spoofer location 166 of the spoofer 110 to enable one or more actions to be taken to address the spoofing. The one or more actions may include alerting authorities that the spoofed data 112 is being broadcast resulting in positioning errors that may have disastrous consequences, such as, for example car accidents. In response, the authorities (e.g., police) may take appropriate action to stop the broadcast of the spoofed data 112. The server 104 may determine the spoofer location 166 of the spoofer 110 by "crowdsourcing" using data from the IOT devices 102, as described herein.

The server 104 may store, in a database 142, the data received from the IOT devices 102, the intermediate result of the calculations performed to determine whether spoofing is occurring, and other data. In this way, the server 104 has access to historical data to perform various types of analysis such as, for example, to determine which sub-regions are targeted for spoofing, which frequencies are used for spoofing, and the like. In addition, if machine learning is used, then the machine learning may be periodically re-trained after additional data has been received.

After the spoofing detector 132 determines that spoofing is occurring, the server 104 may use network management 144 to manage the network 106, the IOT devices 102, and the UE 108 in the region. For example, after spoofing is detected, the server 104 may monitor the messages 130 being received from individual IOT devices 102 to determine whether spoofing is continuing. If the network management 144 determines, at some point in time, that the spoofing has ceased (e.g., the spoofed data 112 is not being received by the IOT devices 102), then the server 104 may stop performing the network management 144.

Based on determining that spoofing is occurring, the server 104 may send a spoofing alert 146 to the IOT devices 102, the user equipment 108, or both. Based on a confidence level, the server 104 may include details about the spoofed data 112 in the spoofing alert 146, such as, for example, the sub-region 154 in which the spoofed data 112 is being broadcast, frequencies at which the spoofed data 112 is being broadcast, constellations being spoofed, and other details associated with the spoofed data 112. Based on the details of the spoofing provided in the spoofing alert 146, the IOT devices 102 and the user equipment 108 may ignore the spoofed data 112. For example, a vehicle (e.g., one of the user equipment 108) moving from a first sub-region (e.g., in which spoofing is not occurring) to a second sub-region (e.g., in which spoofing is occurring) may receive the spoofed data 112, determine that the spoofed data 112 is specified in the spoofing alert 146 and ignore the spoofed data 112 when determining a position fix. In this way, the vehicle can avoid being in an accident, routing the occupants of the vehicle to an incorrect destination, or another undesirable consequence caused by the spoofed data 112.

In some cases, the server 104 may receive the message 130 from a particular one of the IOT devices 102, such as the IOT device 102(N), and not from other IOT devices 102 located near (e.g., in the same sub-region as) the IOT device 102(N). In such cases, the server 104 may determine that the IOT device 102(N) has a defective navigation sensor, is experiencing GNSS reception issues, or both. For example, atmospheric conditions, electromagnetic interference, objects temporally blocking the line of sight between a source of GNSS signals and the IOT device 102(N), a malfunctioning navigation (e.g., GNSS) sensor (e.g., one of the sensors 120), another condition, or any combination thereof may cause the IOT device 102(N) to incorrectly determine that spoofing is occurring and send the message 130 to the server 104. In such cases, the server 104 may remove the IOT device 102(N) from the subset of devices 152 (e.g., thereby not using subsequently sent messages 130 from the IOT device 102(N) to perform the analysis using the analysis module 133). In some cases, the server 104 may send instructions 148 to the IOT device 102(N) to reduce the number of messages 130 being sent by the IOT device 102(N). For example, the instructions 148 may instruct to the IOT device 102(N) to turn off (e.g., disable) the navigation sensor, stop sending the message 130, or another action. In this way, the server 104 may stop receiving the message 130 from the IOT device 102(N) that is erroneously determining that spoofing is occurring. In some cases, the server 104 may alert a maintenance technician that the IOT device 102(N) may be defective. The maintenance technician may schedule maintenance to diagnose and address the problem, such as, for example, by replacing the navigation sensor, removing debris obstructing the line of sight, or the like.

The IOT devices 102 may, in some cases, send an alert 150 directly to one or more of the user equipment 108 located near (e.g., in the same region or sub-region) one or more of the IOT devices 102. The alert 150 may indicate that spoofing may be occurring and may provide details associated with the spoofing, such as the frequencies being used for spoofing, the sub-region (e.g., the sub-region 154) in which the spoofing is occurring, and the like. For example, if the IOT device 102(1) is unable to communicate with the server 104 (e.g., the message 130 is undeliverable), then the IOT device 102(1) may send the alert 150 directly to one or more of the user equipment 108. In this way, if the server 104 is unavailable or communications with the server 104 are unavailable, then the user equipment 108 is able to obtain the alerts 150 indicating potential spoofing and act on the alerts 150 by ignoring the spoofed data 112 when determining a fix. For example, if the user equipment 108(1) receives the alert 150 from at least a threshold number (e.g., M or more, M>1) of the IOT devices 102, then the user equipment 108(1) may determine that spoofing is occurring and ignore the spoofed data 112, use a different positioning mechanism, or both. For example, the spoofing alert 146 and the alert 150 may include an approximate location of the spoofer 110, details about the spoofed data 112, such as the constellations being spoofed, the frequencies being used, and the like. In response to receiving the spoofing alert 146 or the alert 150, the user equipment 108(1) may determine if it is located within a particular distance from the location of the spoofer (e.g., a distance sufficiently close to be able to receive the spoofed data 112). If the user equipment 108(1) is sufficiently close to the spoofer 110 be able to receive the spoofed data 112, then the user equipment 108(1) may ignore the spoofed data 112 and use another positioning technique, such as using other sensors. For example, the user equipment 108(1) may technique. For example, the user equipment 108(1) may determine a most recently obtained position that is known to be accurate (e.g., a position determined prior to receiving the spoofing alert 146 or the alert 150) and use sensor data from other sensors (e.g., accelerometer, gyroscope, magnetic compass (magnetometer), map data, and the like) to determine a current position.

The network management 144 of the server 104 may continue to monitor the message 130 received from the IOT devices 102 until the server 104 determines that spoofing is no longer occurring. For example, the server 104 may perform the analysis (using the analysis module 133) of the messages 130 received from multiple IOT devices 102 and when the results of the analysis module 133 fail to satisfy the conditions 134, then the server 104 may determine that spoofing is no longer present. In response, in some cases, the server 104 may send a spoofing ceased 156 message, indicating that spoofing is no longer present, to the IOT devices 102 and to the user equipment 108. After receiving the spoofing ceased 156 message, the IOT devices 102 and the user equipment 108 may resume acquiring and using GNSS data 168.

Thus, IOT devices co-located with stationary objects, such as, for example, traffic lights, streetlamps, security cameras, and the like, may receive GNSS signals and analyze the received signals to determine whether spoofed GNSS signals are being broadcast. For example, to determine whether spoofing is present, individual IOT devices may determine a difference between a short-term average of GNSS fixes (e.g., real-time position fixes) and a long-term average of GNSS fixes. If an individual IOT device determines that (1) the difference satisfies a first threshold, (2) the difference divided by horizontal estimated position error (HEPE) satisfies a second threshold and (3) if condition (1) and (2) are both true for a particular duration (e.g., a third threshold), then the IOT device may determine that the IOT device is receiving spoofed GNSS data. In response, the IOT device may send a message (e.g., an alert message) to a server. The message may include data associated with the spoofing including the long-term average of GNSS fixes, a short-term average of GNSS fixes, the difference between the two, and other data related to the GNSS signals received by the IOT device. The server may serve a particular region and may receive multiple messages from multiple IOT devices (with individual messages of the multiple messages sent by individual IOT devices of the multiple IOT devices) within the particular region.

The server may analyze the multiple messages to determine whether spoofing is occurring. For example, the server may select a subset of the IOT devices that sent the alert message, determine if the number of IOT devices sending the message in the subset is greater than a first threshold, determine if the percentage of IOT devices sending the message relative to the total number of IOT devices is greater than a second threshold, and determine whether the number of IOT devices in the subset have been sending the message repeatedly for at least a particular duration. If the server determines that the criteria have been satisfied, then the server determines that spoofing is occurring. For example, if the server determines that multiple static IOT devices in a sub-region are moving in similar patterns, then the server may determine that spoofed data is present. To illustrate, if positions jumps are similar, e.g., due to the IOT devices receiving spoofed ephemerides, then the server may conclude that spoofed data is present. As another illustration, if the positions of multiple IOT devices jump to a same point, e.g., due to meaconing, then the server may determine that spoofed data is present.

By using the data from multiple IOT devices, the server can reliably determine whether spoofing is being performed. Thus, reliability is improved compared to conventional means of determining spoofing because multiple devices are able to confirm the spoofing. In addition, if a particular IOT device is sending messages while others in a nearby vicinity are not, then the server can determine that the particular IOT device may have a malfunctioning GNSS sensor or something may be interfering with the ability of the particular IOT device to receive the GNSS signals that causes the IOT device to mistakenly determine that GNSS spoofing may be occurring. The server can request that the particular IOT device temporarily disabled the GNSS sensor and request that maintenance be performed to the particular IOT device to address the issue. Thus, unreliable IOT devices can be identified and remediated.

Figure 2:
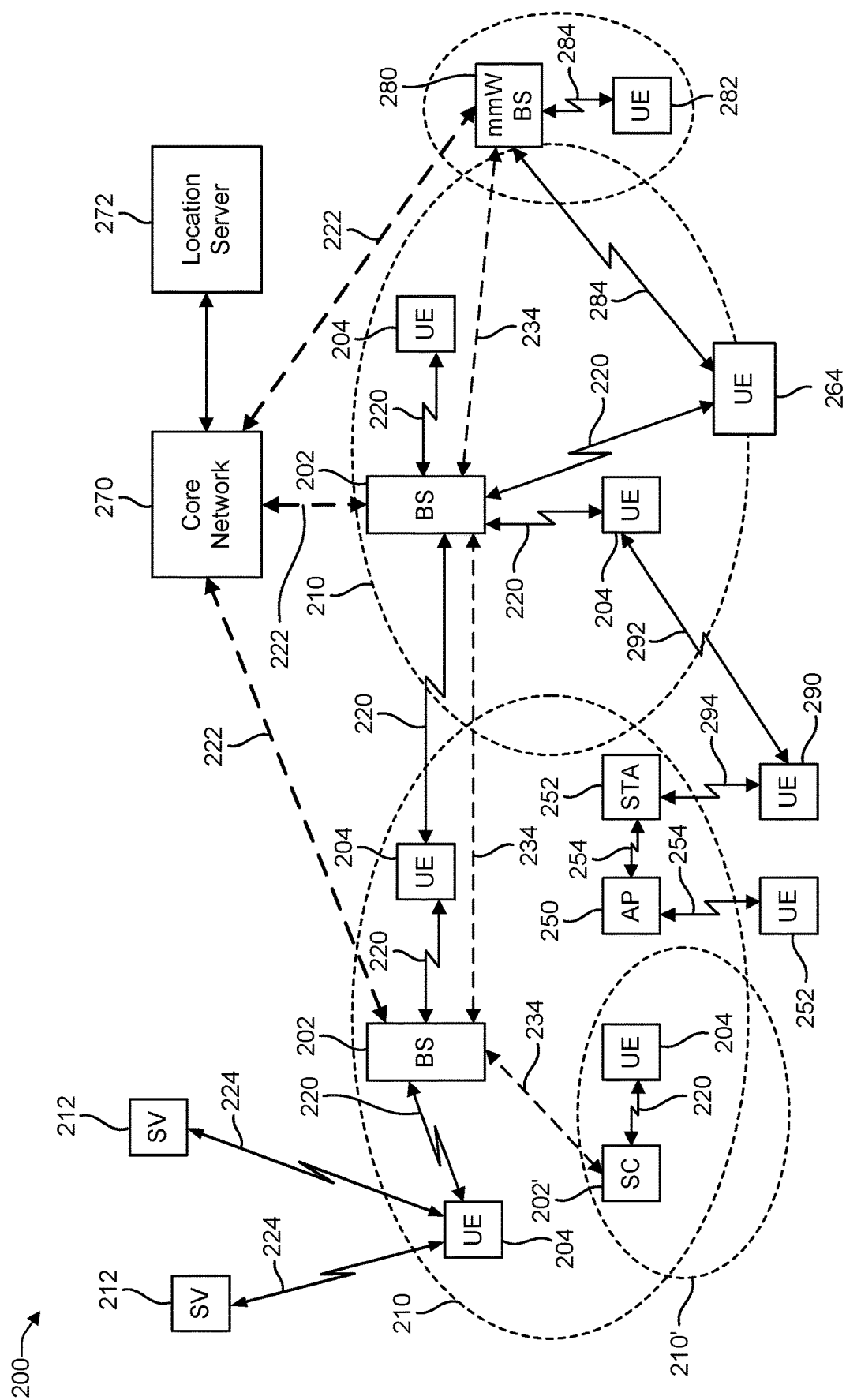
FIG. 2 illustrates an example wireless communications system, according to various aspects of the disclosure.

FIG. 2 illustrates an example wireless communications system 200. The wireless communications system 200 (which may also be referred to as a wireless wide area network (WWAN)) may include various base stations 202 and various UEs 204. The base stations 202 may include macro cell base stations (high power cellular base stations) and/or small cell base stations (low power cellular base stations). In an aspect, the macro cell base station may include eNBs and/or ng-eNBs where the wireless communications system 200 corresponds to an LTE network, or gNBs where the wireless communications system 200 corresponds to a NR network, or a combination of both, and the small cell base stations may include femtocells, picocells, microcells, etc.

The base stations 202 may collectively form a RAN and interface with a core network 270 (e.g., an evolved packet core (EPC) or a 5G core (5GC)) through backhaul links 222, and through the core network 270 to one or more location servers 272 (which may be part of core network 270 or may be external to core network 270). In addition to other functions, the base stations 202 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 202 may communicate with each other directly or indirectly (e.g., through the EPC/5GC) over backhaul links 234, which may be wired or wireless.

The base stations 202 may wirelessly communicate with the UEs 204. Each of the base stations 202 may provide communication coverage for a respective geographic coverage area 210. In an aspect, one or more cells may be supported by a base station 202 in each geographic coverage area 210. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), a virtual cell identifier (VCI), a cell global identifier (CGI)) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both of the logical communication entity and the base station that supports it, depending on the context. In some cases, the term "cell" may also refer to a geographic coverage area of a base station (e.g., a sector), insofar as a carrier frequency can be detected and used for communication within some portion of geographic coverage areas 210.

While neighboring macro cell base station 202 geographic coverage areas 210 may partially overlap (e.g., in a handover region), some of the geographic coverage areas 210 may be substantially overlapped by a larger geographic coverage area 210. For example, a small cell (SC) base station 202' may have a geographic coverage area 210' that substantially overlaps with the geographic coverage area 210 of one or more macro cell base stations 202. A network that includes both small cell and macro cell base stations may be known as a heterogeneous network. A heterogeneous network may also include home eNBs (HeNBs), which may provide service to a restricted group known as a closed subscriber group (CSG).

The communication links 220 between the base stations 202 and the UEs 204 may include uplink (also referred to as reverse link) transmissions from a UE 204 to a base station 202 and/or downlink (also referred to as forward link) transmissions from a base station 202 to a UE 204. The communication links 220 may use MIMO antenna technology, including spatial multiplexing, beamforming, and/or transmit diversity. The communication links 220 may be through one or more carrier frequencies. Allocation of carriers may be asymmetric with respect to downlink and uplink (e.g., more or less carriers may be allocated for downlink than for uplink).

The wireless communications system 200 may further include a wireless local area network (WLAN) access point (AP) 250 in communication with WLAN stations (STAs) 252 via communication links 254 in an unlicensed frequency spectrum (e.g., 5 GHz). When communicating in an unlicensed frequency spectrum, the WLAN STAs 252 and/or the WLAN AP 250 may perform a clear channel assessment (CCA) or listen before talk (LBT) procedure prior to communicating in order to determine whether the channel is available.

The small cell base station 202' may operate in a licensed and/or an unlicensed frequency spectrum. When operating in an unlicensed frequency spectrum, the small cell base station 202' may employ LTE or NR technology and use the same 5 GHz unlicensed frequency spectrum as used by the WLAN AP 250. The small cell base station 202', employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 200 may further include a millimeter wave (mmW) base station 280 that may operate in mmW frequencies and/or near mmW frequencies in communication with a UE 282. Extremely high frequency (EHF) is part of the RF in the electromagnetic spectrum. EHF has a range of 30 GHz to 300 GHz and a wavelength between 2 millimeter and 20 millimeters. Radio waves in this band may be referred to as a millimeter wave. Near mmW may extend down to a frequency of 3 GHz with a wavelength of 200 millimeters. The super high frequency (SHF) band extends between 3 GHz and 30 GHz, also referred to as centimeter wave. Communications using the mmW/near mmW radio frequency band have high path loss and a relatively short range. The mmW base station 280 and the UE 282 may utilize beamforming (transmit and/or receive) over a mmW communication link 284 to compensate for the extremely high path loss and short range. Further, it will be appreciated that in alternative configurations, one or more base stations 202 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

Transmit beams may be quasi-co-located, meaning that they appear to the receiver (e.g., a UE) as having the same parameters, regardless of whether or not the transmitting antennas of the network node themselves are physically co-located. In NR, there are four types of quasi-co-location (QCL) relations. Specifically, a QCL relation of a given type means that certain parameters about a target reference RF signal on a target beam can be derived from information about a source reference RF signal on a source beam. If the source reference RF signal is QCL Type A, the receiver can use the source reference RF signal to estimate the Doppler shift, Doppler spread, average delay, and delay spread of a target reference RF signal transmitted on the same channel. If the source reference RF signal is QCL Type B, the receiver can use the source reference RF signal to estimate the Doppler shift and Doppler spread of a target reference RF signal transmitted on the same channel. If the source reference RF signal is QCL Type C, the receiver can use the source reference RF signal to estimate the Doppler shift and average delay of a target reference RF signal transmitted on the same channel. If the source reference RF signal is QCL Type D, the receiver can use the source reference RF signal to estimate the spatial receive parameter of a target reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Receive beams may be spatially related. A spatial relation means that parameters for a transmit beam for a second reference signal can be derived from information about a receive beam for a first reference signal. For example, a UE may use a particular receive beam to receive one or more reference downlink reference signals (e.g., positioning reference signals (PRS), tracking reference signals (TRS), phase tracking reference signal (PTRS), cell-specific reference signals (CRS), channel state information reference signals (CSI-RS), primary synchronization signals (PSS), secondary synchronization signals (SSS), synchronization signal blocks (SSBs), etc.) from a base station. The UE can then form a transmit beam for sending one or more uplink reference signals (e.g., uplink positioning reference signals (UL-PRS), sounding reference signal (SRS), demodulation reference signals (DMRS), PTRS, etc.) to that base station based on the parameters of the receive beam.

Note that a "downlink" beam may be either a transmit beam or a receive beam, depending on the entity forming it.

For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

In 5G, the frequency spectrum in which wireless nodes (e.g., base stations 202/280, UEs 204/182) operate is divided into multiple frequency ranges, FR1 (from 450 to 6000 MHz), FR2 (from 24250 to 52600 MHz), FR3 (above 52600 MHz), and FR4 (between FR1 and FR2). In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 204/282 and the cell in which the UE 204/282 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 204 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 204/282 in a cell may have different downlink primary carriers. The same is true for the uplink primary carriers. The network is able to change the primary carrier of any UE 204/282 at any time. This is done, for example, to balance the load on different carriers. Because a "serving cell" (whether a PCell or an SCell) corresponds to a carrier frequency/component carrier over which one base station is communicating, the term "cell," "serving cell," "component carrier," "carrier frequency," and the like can be used interchangeably.

For example, still referring to FIG. 2, one of the frequencies utilized by the macro cell base stations 202 may be an anchor carrier (or "PCell") and other frequencies utilized by the macro cell base stations 202 and/or the mmW base station 280 may be secondary carriers ("SCells"). The simultaneous transmission and/or reception of multiple carriers enables the UE 204/282 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

The wireless communications system 200 may further include a UE 264 that may communicate with a macro cell base station 202 over a communication link 220 and/or the mmW base station 280 over a mmW communication link 284. For example, the macro cell base station 202 may support a PCell and one or more SCells for the UE 264 and the mmW base station 280 may support one or more SCells for the UE 264.

In the example of FIG. 2, one or more Earth orbiting satellite positioning system (SPS) space vehicles (SVs) 212 (e.g., satellites) may be used as an independent source of location information for any of the illustrated UEs (shown in FIG. 2 as a single UE 204 for simplicity). A UE 204 may include one or more dedicated SPS receivers specifically designed to receive SPS signals 224 for deriving geo location information from the SVs 212. An SPS typically includes a system of transmitters (e.g., SVs 212) positioned to enable receivers (e.g., UEs 204) to determine their location on or above the Earth based, at least in part, on signals (e.g., SPS signals 224) received from the transmitters. Such a transmitter typically transmits a signal marked with a repeating pseudo-random noise (PN) code of a set number of chips. While typically located in SVs 212, transmitters may sometimes be located on ground-based control stations, base stations 202, and/or other UEs 204.

The use of SPS signals 224 can be augmented by various satellite-based augmentation systems (SBAS) that may be associated with or otherwise enabled for use with one or more global and/or regional navigation satellite systems. For example, an SBAS may include an augmentation system(s) that provides integrity information, differential corrections, etc., such as the Wide Area Augmentation System (WAAS), the European Geostationary Navigation Overlay Service (EGNOS), the Multi-functional Satellite Augmentation System (MSAS), the Global Positioning System (GPS) Aided Geo Augmented Navigation or GPS and Geo Augmented Navigation system (GAGAN), and/or the like. Thus, as used herein, an SPS may include any combination of one or more global and/or regional navigation satellite systems and/or augmentation systems, and SPS signals 224 may include SPS, SPS-like, and/or other signals associated with such one or more SPS.

The wireless communications system 200 may further include one or more UEs, such as UE 290, that connects indirectly to one or more communication networks via one or more device-to-device (D2D) peer-to-peer (P2P) links (referred to as "sidelinks"). In the example of FIG. 2, UE 290 has a D2D P2P link 292 with one of the UEs 204 connected to one of the base stations 202 (e.g., through which UE 290 may indirectly obtain cellular connectivity) and a D2D P2P link 294 with WLAN STA 252 connected to the WLAN AP 250 (through which UE 290 may indirectly obtain WLAN-based Internet connectivity). In an example, the D2D P2P links 292 and 294 may be supported with any well-known D2D RAT, such as LTE Direct (LTE-D), WiFi Direct (WiFi-D), Bluetooth, and so on.

In the flow diagrams of FIGS. 3, 4, 5, 6, 7, and 8 each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes. For discussion purposes, the processes 300, 400, 500, 600, 700, and 800 are described with reference to FIGS. 1 and 2 as described above, although other models, frameworks, systems and environments may be used to implement these processes.

Figure 3:
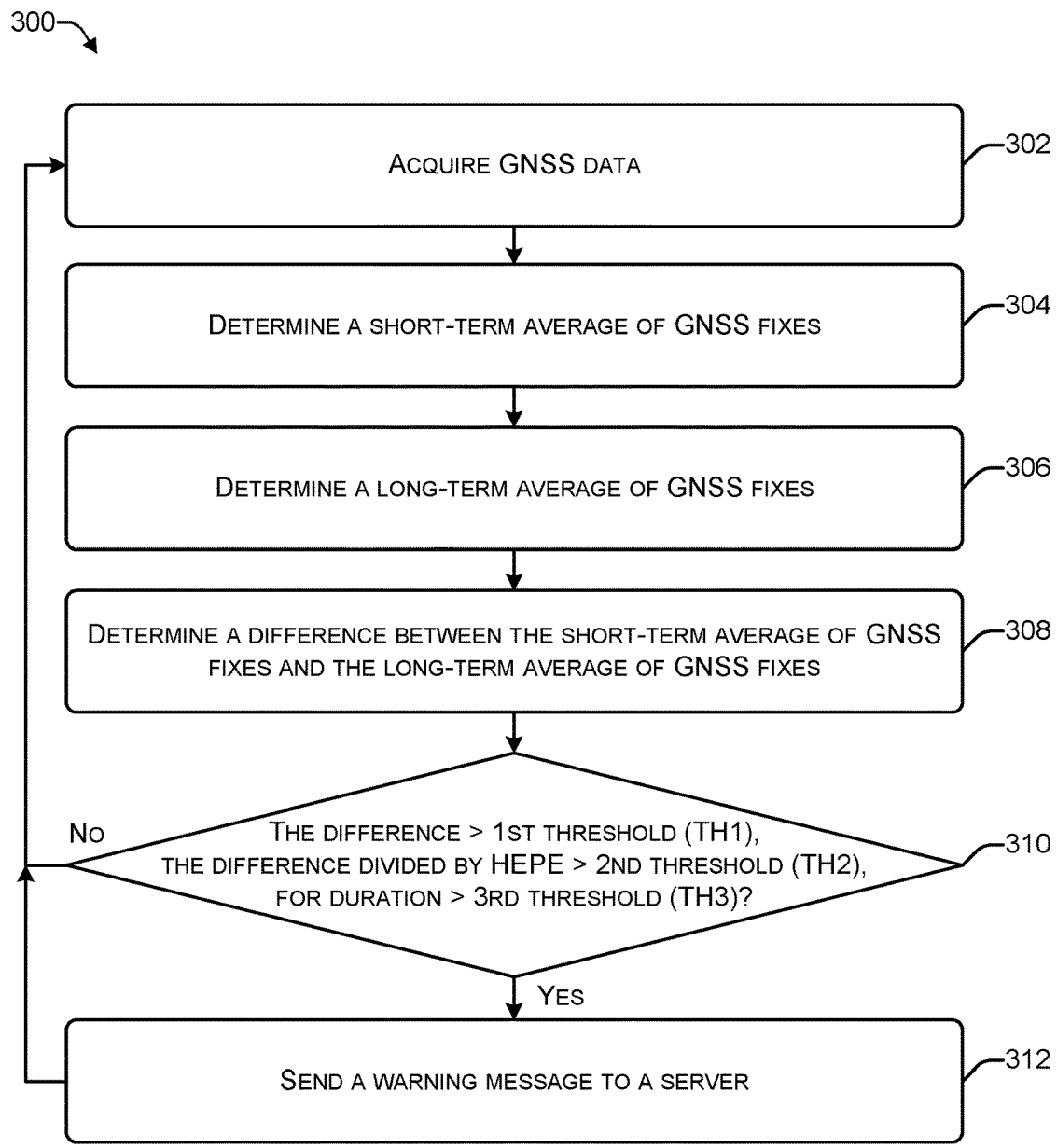
FIG. 3 illustrates an example process to determine whether to send a warning message, according to aspects of the disclosure.

FIG. 3 illustrates a process 300 to determine whether to send a warning message, according to aspects of the disclosure. For example, the process 300 may be performed by individual ones of the IOT devices 102 of FIG. 1. Global Positioning System (GPS), which is a type of GNSS, uses a 10-bit field to encode week numbers in each GPS time signal, which means that a maximum of 1,024 weeks (19.7 years), can be used. The 1,024-week period is referred to as an "epoch". At the end of each epoch of 1,024 weeks, the receiver resets the week number to zero and starts counting again.

At 302, the process acquires GNSS data. At 303, the process determines the short-term average of GNSS fixes 124 of FIG. 1. For example, the process may use the following equation:

$$\vec{r}_s(k) = \frac{1}{T_S} \sum_{k-T_S+1}^{k} \vec{r}(k)$$

in which the short-term average of GNSS fixes 124 for epoch k is determined based on summing each GNSS fix at epoch k for each IOT device n and dividing by $T_s$, the number of fixes in a relatively short period of time. $T_s$ may range from 10 seconds to 60 seconds and in some aspects may be 20 seconds.

At 306, the process determines the long-term average of GNSS fixes 126 of FIG. 1. For example, the process may use the following equation:

$$\vec{r}_l(k) = \frac{1}{T_l} \sum_{k-T_l+1}^{k} \vec{r}(k)$$

in which the long-term average of GNSS fixes 126 for epoch k is determined based on summing each GNSS fix at epoch k for each IOT device n and dividing by $T_l$, the number of fixes in a relatively long period of time. For example, $T_l$ may range from 1 day to 30 days and in some aspects, may be a week.

At 308, the process determines a difference (e.g., in distance) between the short-term average of GNSS fixes 124 and the long-term average of GNSS fixes 126. The difference Δr(k) for epoch k may be determined by taking an absolute value of subtracting the long-term average of GNSS fixes 126 from the short-term average of GNSS fixes 124, as per the following equation:

$$\Delta r(k) = |\vec{r}_s(k) - \vec{r}_l(k)|^2$$

After determining the short-term average of GNSS fixes (at 304), the long-term average of GNSS fixes (at 306), and the difference (at 308), at 310, the process determines whether particular criteria are met. At 308, the process determines whether (1) Δr (the difference between the long-term average and the short-term average of GNSS fixes) is greater than a 1st threshold (TH1), (2) whether Δr divided by HEPE is greater than a 2nd threshold (TH2) and whether both (1) and (2) have occurred for a duration greater than a 3rd threshold (TH3). For example, the 1st threshold TH1 may be 200 meters (m), the 2nd threshold TH2 may be five, the 3rd threshold TH3 may be 20 seconds, and HEPE may be 50 m or greater.

If the process determines, at 310, that "yes" the criteria have been satisfied, then the process sends a warning message to a server. For example, in FIG. 1, if the IOT device 102(1) determines that the difference between the ST AVG 124 and the LT AVG 126 satisfy the criteria 128, then the IOT device 102(1) sends the message 130 to the server 104. If the process determines, at 310, that "no" the criteria have not been satisfied, then the process proceeds to 302 to acquire additional GNSS data.

The server 104 may determine the spoofer location 166 of the spoofer 110 ($\hat{\vec{r}}_{spoofer}$) by "crowdsourcing" the data from the IOT devices 102. The server 104 receives in the message 130 (e.g., sent by individual devices in the subset of devices 152) Δr and $\vec{r}_l$ (long term average of GNSS fixes 126). The server 104 crowdsources data from a portion of the IOT devices 102 to estimate the location of the spoofer 110, regardless of whether the spoofer 110 is static or moving. Assuming 1/Δr is proportional to the distance between the spoofer 110 and individual ones of the IOT devices 102. The server 104 uses $\vec{r}_l$ as a reference position and determines a weighted averaging of $\vec{r}_l$ using a weighting w for individual ones of the IOT devices 102 as a function of Δr, as shown in the following equation:

$$\hat{\vec{r}}_{spoofer}(k) = \frac{\sum_{n=1}^{N} [w(\Delta r_n(k)) \cdot \vec{r}_{ln}(k)]}{\sum_{n=1}^{N} w(\Delta r_n(k))}$$

where k is the time epoch, n is the index of each IOT devices sending message in the subset of devices 152, and N is the total number of IOT devices sending message in the subset of devices 152.

Figure 4:
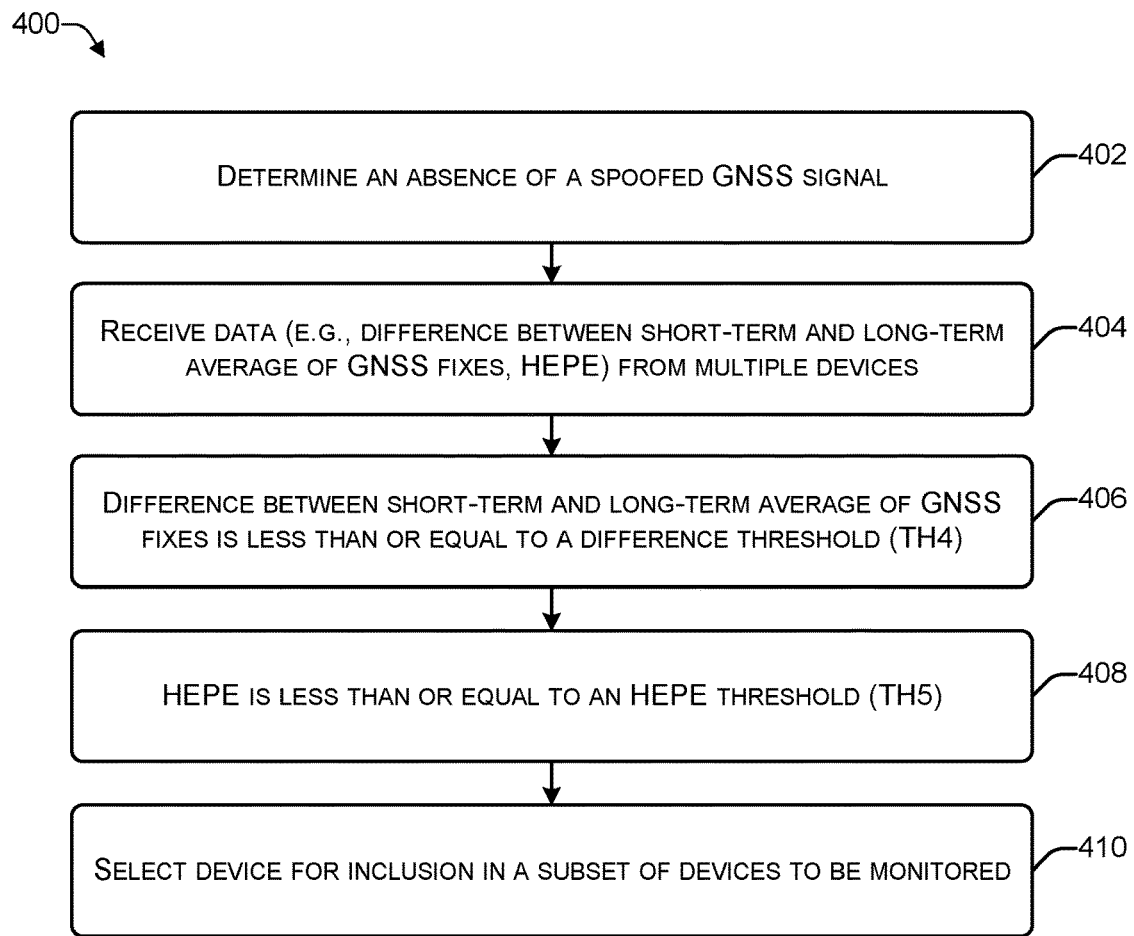
FIG. 4 illustrates an example process to select a subset of devices to monitor, according to aspects of the disclosure.

FIG. 4 illustrates a process 400 to select a subset of devices to monitor, according to aspects of the disclosure. The process 400 may be performed by the server 104 of FIG. 1.

At 402, the process determines an absence of a spoofed GNSS signal. At 404, the process receives data from multiple devices. The data includes a difference between short-term and long-term GNSS fixes, HEPE, and the like. For example, in FIG. 1, the server 104 may receive the message 130 that includes a difference between the ST AVG 124 and the LT AVG 126, and the HEPE 123.

At 406, the process determines, for each device of the multiple devices, if (1) the difference between the short-term and the long-term average of GNSS fixes is less than or equal to a difference threshold (TH4) and at 408, if (2) the HEPE is less than or equal to an HEPE threshold (TH5). If both (1) and (2) are satisfied, then, at 410, the device is selected for inclusion in a subset of devices that the server monitors. For example, in FIG. 1, the server 104 determines that spoofed data 112 is absent, requests that the IOT devices 102 send data, such as the difference between the ST AVG 124 and the LT AVG 126 and the HEPE 123. For each particular IOT device of the IOT devices 102, if the difference is less than or equal to the threshold TH4 and the HEPE is less than or equal to the threshold TH5, then the server 104 may include the particular IOT device in the subset of devices 152. The server 104 may use warning messages (e.g., the message 130) received from the subset of devices 152 when determining if spoofing is occurring.

Thus, the server 104 of FIG. 1 may select the subset of devices 152 (also referred to as selected devices) that are considered "normal", e.g., during a time when spoofing is not occurring, by selecting a subset of the IOT devices 102 for which (1) Δr is less than or equal to a 4th threshold (TH4) and (2) HEPE is less than or equal to a 5th threshold (TH5). The 4th and 5th thresholds may vary based on factors such as the number of IOT devices the server 104 is managing, how much interference the IOT devices experience, and the like. The 4th and 5th thresholds may be set to values that filter out IOT devices that are sending the message 130 based on relatively small errors (e.g., relatively small Δr and relatively small HEPE) when spoofing is not occurring.

Figure 5:
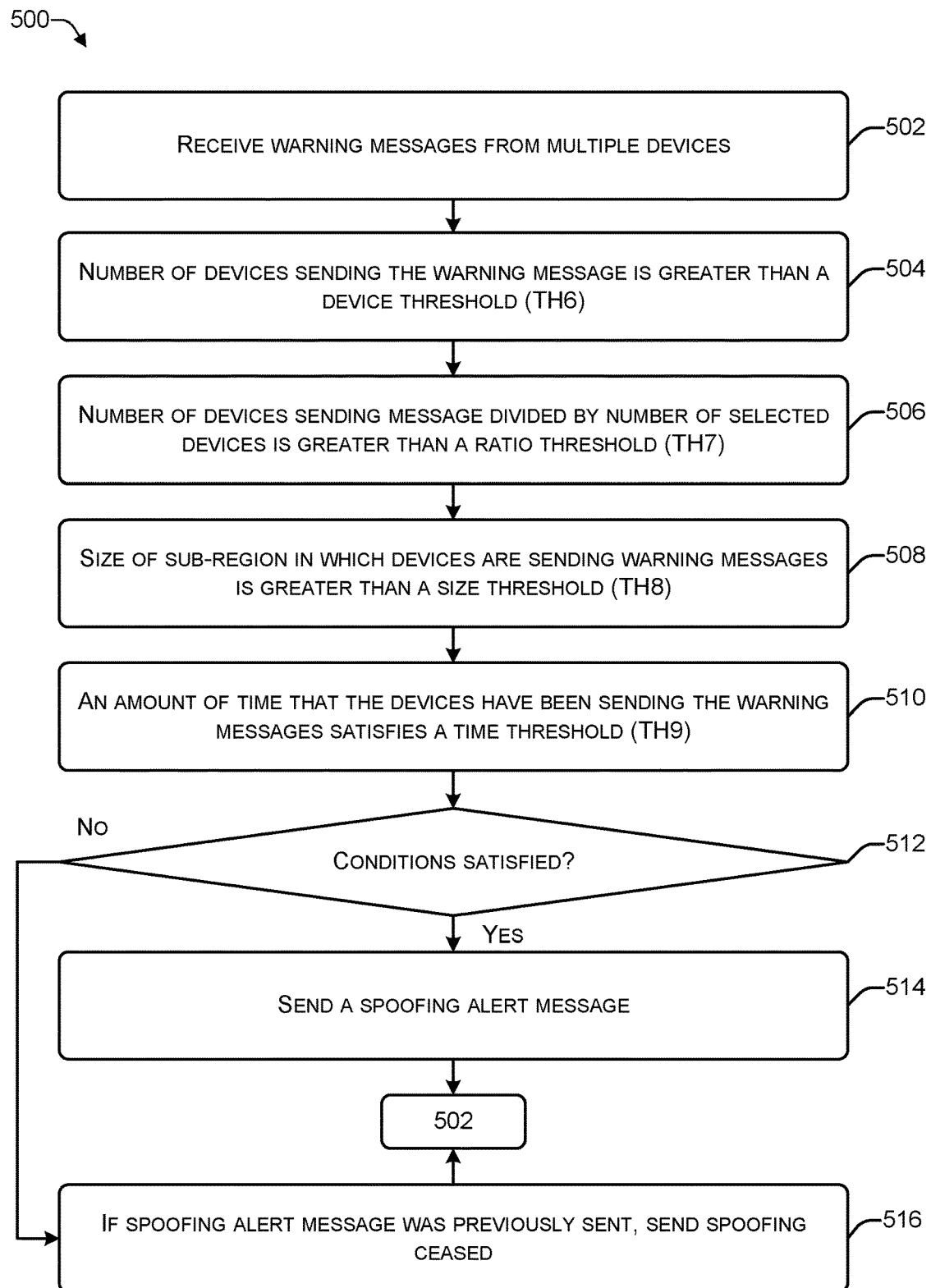
FIG. 5 illustrates an example process to determine if a spoofed signal is being broadcast, according to aspects of the disclosure.

FIG. 5 illustrates a process 500 to determine if a spoofed signal is being broadcast, according to aspects of the disclosure. The process 500 may be performed by the server 104 of FIG. 1.

At 502, the process receives warning messages from each of multiple devices of the selected devices. Each warning message includes data associated with each device, such as a difference between short-term and long-term averages of GNSS fixes, HEPE, and the like. For example, in FIG. 1, the server 104 may receive the message 130 from one or more of the IOT devices 102. The message 130 may include data, such as a difference between the ST AVG 124 and the LT AVG 126, the HEPE 123, and the like.

At 504, the process may determine if a number of IOT devices sending the message indicating potential spoofing satisfies a 6th threshold (TH6). At 506, the process may determine if the number of IOT devices sending the message 130 divided by the number of devices in the subset of devices 152 is greater than a 7th threshold (TH7). In some cases, the number of IOT devices sending the message 130 divided by the subset of IOT devices may be expressed as a percentage. At 508, the process may determine if a size of a sub-region from which devices are sending messages is greater than an 8th threshold (TH8). At 510, the process may determine if the IOT devices have been sending the message 130 for more than a 9th threshold amount of time (TH9). At 512, the process determines whether the conditions 504, 506, 508, and 510 are satisfied. If the process determines, at 512, that "yes" the conditions are satisfied, the process sends a spoofing alert message, at 514. The process proceeds back to 502 to receive additional messages. If the process determines, at 512, that "no" the conditions are not satisfied, the process sends a spoofing ceased message if the spoofing alert message was previously sent, at 516. The process proceeds back to 502 to receive additional messages. For example, in FIG. 1, if the server 104 determines that the conditions 504, 506, 508, and 510 are satisfied, then the server 104 performs various actions (e.g., as described herein), including sending the spoofing alert to the IOT devices 102 and to the UEs 108. The server 104 determines that spoofing is no longer occurring based on determining that:

$$\Delta r < TH4 \text{ for } x\%(x\% > TH7) \text{ of devices}$$

Thus, after IOT devices in the selected subset of IOT devices begin sending a warning message (e.g., indicating possible spoofing) to the server 104, the server 104 may determine information, such as, for example, how many of the subset of IOT devices are sending the message, the ratio of IOT devices sending the message to the selected number of IOT devices, the number of IOT devices sending the message that are located in a particular sub-region of a region (e.g., a neighborhood in a city), and whether the IOT devices have been sending the message for more than a threshold amount of time. Based on determining this information, the server may determine whether or not spoofing is occurring.

Figure 6:
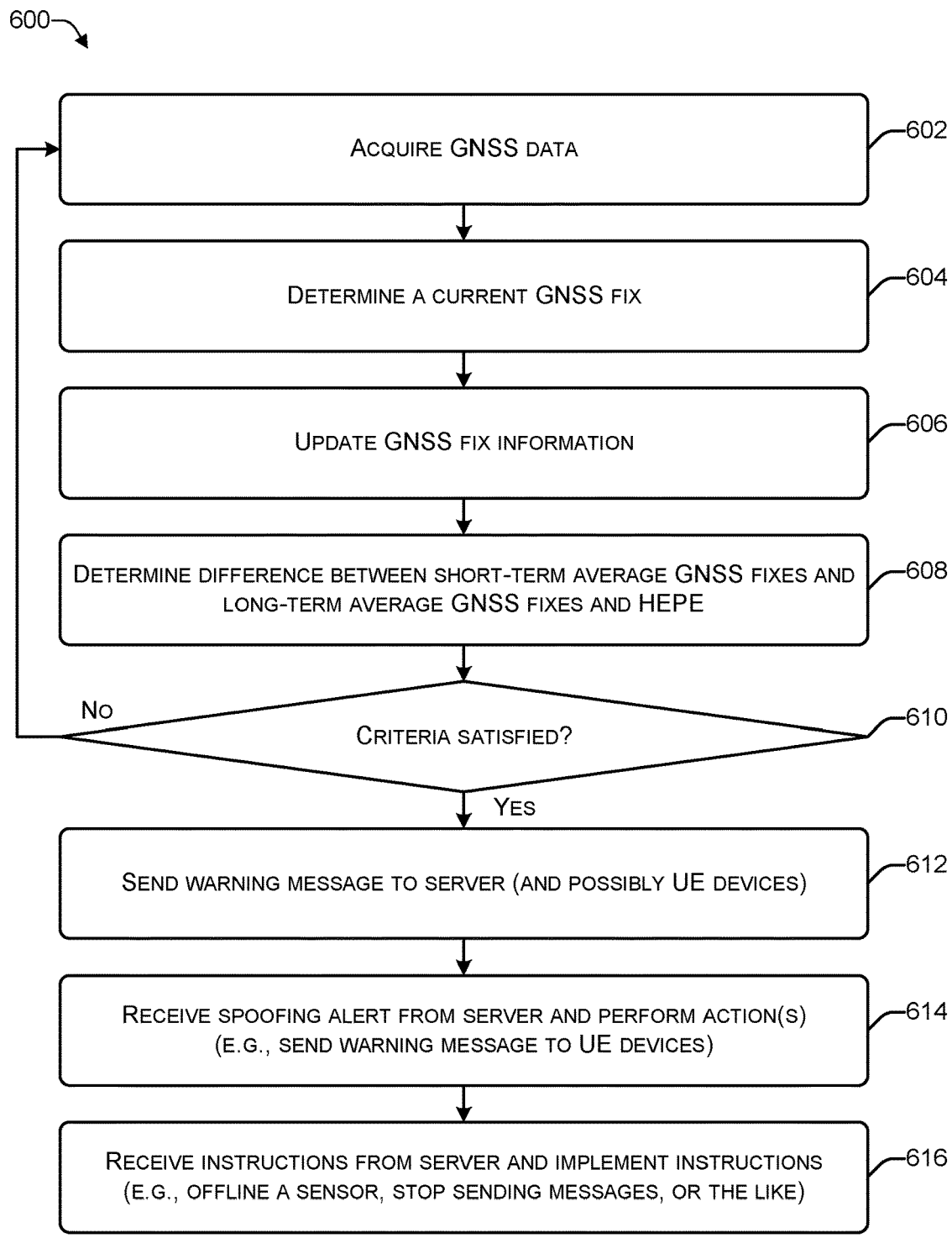
FIG. 6 illustrates an example process that includes sending a warning message to a server, according to aspects of the disclosure.

FIG. 6 illustrates an example process 600 that includes sending a warning message to a server, according to aspects of the disclosure. The process 600 may be performed by individual ones of the IOT devices 102 of FIG. 1.

At 602, the process acquires GNSS data. At 604, the process determines a current GNSS fix based on the GNSS data. At 606, the process updates GNSS fix information (short-term average 124 and long-term average 126) using the current GNSS fix. For example, in FIG. 1, the sensors 120 of the IOT device 102(1) may receive GNSS data 168 (e.g., from a satellite) or the spoofed data 112 and determine a current fix using the GNSS data 168. The IOT device 102(1) may retrieve the fixes 121 that includes the current fix and previously determined fixes. The IOT device 102(1) may also retrieve the short-term average 124 and the long-term average 126. The spoofed data 112 may include spoofed constellations, spoofed frequencies, or both.

At 608, the process may determine a difference between a short-term average of the GNSS fixes and a long-term average of the GNSS fixes and HEPE. At 610, the process may determine whether one or more criteria have been satisfied. If the process determines, at 610, that the criteria have not been satisfied, then the process proceeds to 602 to acquire additional GNSS data 168. For example, in FIG. 1, the IOT device 102(1) uses the fixes 121 to determine the short-term average of the GNSS fixes 124 and the long-term average of the GNSS fixes 126 and determine the HEPE 123. If the process determines that the criteria 128 (e.g., 310 of FIG. 3) have not been satisfied, then the process acquires additional GNSS data 168 and determines an additional fix.

If the process determines, at 610, that the criteria have been satisfied, then the process proceeds to 612. At 612, the process may send a warning message to a server (and possibly to user equipment devices). For example, in FIG. 1, if the process determines that the criteria 128 (e.g., 208, 210, 212 of FIG. 2) have been satisfied, then the process sends the message 130 to the server 104 to alert the server 104 that spoofing may be occurring. In some cases, the IOT device 102(1) may send the alert 150 to one or more of the user equipment 108. For example, if the IOT device 102(1) is unable to communicate with the server 104, then the IOT device 102(1) may send the alert 150 to at least user equipment 108 that is located in a sub-region 154 in which the IOT device 102 is located.

At 614, the process may receive a spoofing alert from the server and perform one or more actions. For example, in FIG. 1, the IOT device 102(1) receives the spoofing alert 146 from the server 104. The spoofing alert 146 may provide details about the spoofed data 112, such as, for example, in which sub-region (e.g., the sub-region 154) the spoofed data 112 is being broadcast, a frequency at which the spoofed data 112 is being broadcast, and other details about the spoofed data 112. In response, the IOT device 102(1) may perform one or more actions, such as, for example, not including the spoofed data 112 when determining the long-term average. The IOT device 102(1) may continue to monitor the spoofed data 112 to determine when the spoofing ends. For example, the IOT device 102(1) may keep sending the message 130 while the spoofed data 112 is being broadcast. The IOT device 102(1) may stop updating the long-term average so that the long-term average is unaffected by the spoofed data 112 and is sufficiently accurate to serve as a reference position.

At 616, the process may receive instructions from the server and implement the instructions. For example, in FIG. 1, the IOT device 102(1) may, in response to receiving the instructions 148 from the server 104, not update the long-term average 126 using the current GNSS fix, discard the spoofed data 112 based on information provided in the spoofing alert 146, not generate any additional ones of the message 130, disable a navigation sensor of the sensors 120, power down the IOT device 102(1), perform another action, or any combination thereof.

Thus, an IOT device (e.g., a stationary IOT device) receives GNSS data and determines a current fix based on the GNSS data. The IOT device uses the current fix and previously determined fixes to determine a difference between the short-term average of the fixes and the long-term average of the fixes. If the difference is greater than a first threshold and the difference relative to the HEPE is greater than a second threshold for a period of time (e.g., duration) greater than a third threshold, then the IOT device may determine that spoofing is occurring and send a message to a server indicating the spoofing. The message to the server may include the fixes, the short-term average of the fixes, the long-term average of the fixes, the difference between the short-term and long-term averages of the fixes, the HEPE, other data, or any combination thereof.

Figure 7:
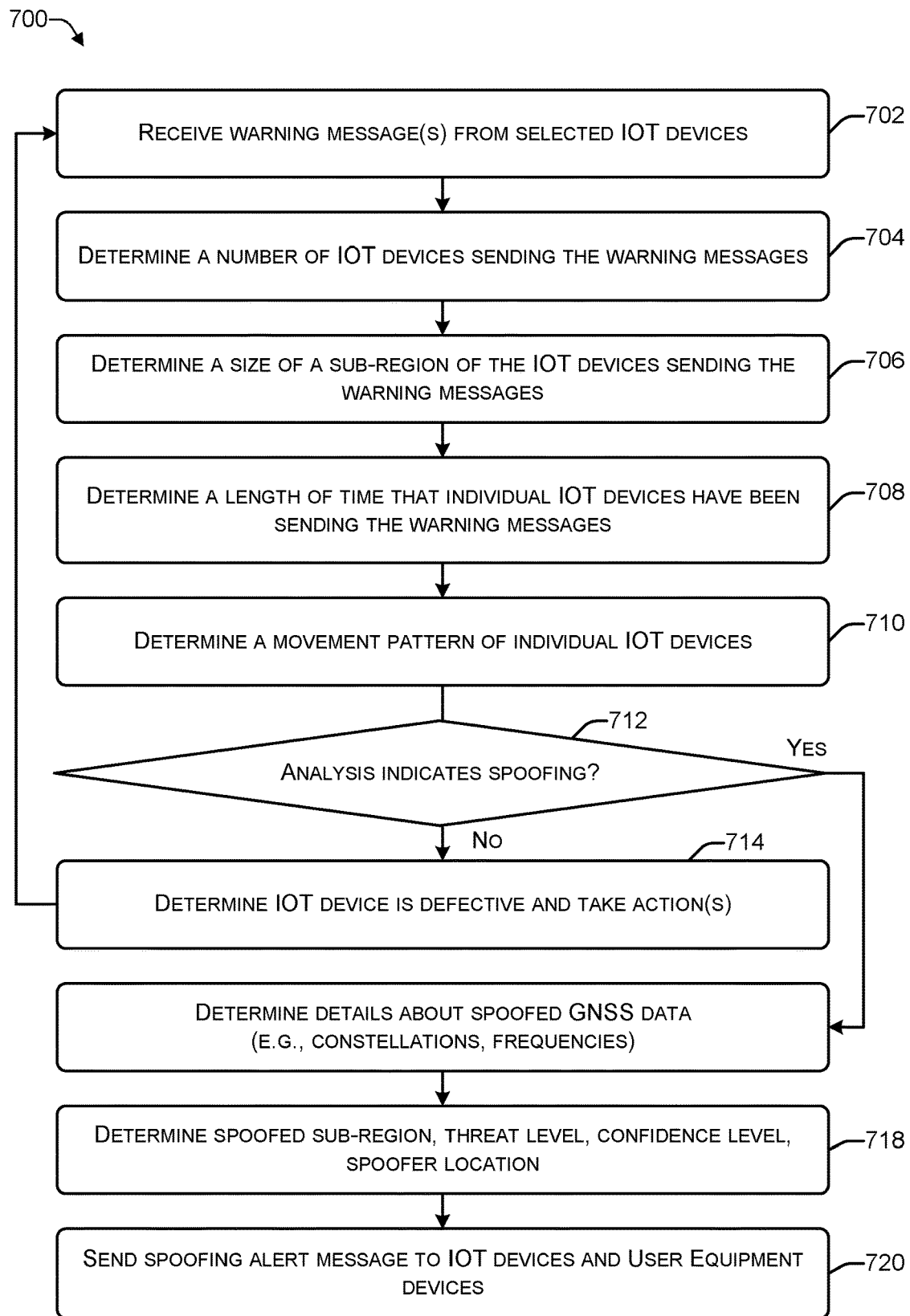
FIG. 7 illustrates an example process that includes performing an analysis to determine whether spoofed GNSS data is being received by devices, according to aspects of the disclosure.

FIG. 7 illustrates an example process 700 that includes performing an analysis to determine whether spoofed GNSS data is being received by devices, according to aspects of the disclosure. The process 700 may be performed by the server 104 of FIG. 1.

At 702, the process receives warning messages from selected IOT devices. At 704, the process may determine a number of IOT devices sending the warning message. At 706, the process may determine a location (e.g., sub-region) of individual IOT devices. At 708, the process may determine a length of time that individual IOT devices have been sending the warning message. At 710, the process may determine a movement pattern of individual IOT devices. At 712, the process may perform an analysis and determine whether the analysis indicates spoofing is present. If the process determines, at 712, that the analysis indicates that "no", spoofing is not present, then the process may at 714, determine that a particular IOT device is defective and take one or more actions. The process may proceed back to 702 to receive additional warning messages from selected IOT devices. For example, in FIG. 1, the server 104 selects, when spoofing is not present, the subset of devices 152 (from the IOT devices 102) based on one or more criteria (e.g., 302 and 304 of FIG. 3). The server 104 ignores the message 130 received from IOT devices 102 not included in the subset of devices 152. After the server 104 receives the message 130 from individual devices in the subset of devices 152, the server 104 may perform an analysis, including determining a number of the IOT devices sending the warning message, determining a location of individual IOT devices sending the warning message, determining a length of time that individual IOT devices have been sending the warning messages, and determining a movement pattern of individual IOT devices. The server 104 may determine whether results of the analysis satisfy one or more criteria (e.g., 306, 308, 310, and 312 of FIG. 3). If the server 104 determines that the results of the analysis indicates that not all of the criteria have been satisfied, then the server 104 may determine that a particular IOT device of the IOT devices 102 sending the warning message 130 is defective. In response, the server 104 may remove the particular IOT device from the subset of IOT devices being monitored and, in some cases, send the instructions 148 to the particular IOT device. The instructions 148 may instruct the particular IOT device to disable a potentially malfunctioning sensor (e.g., navigation sensor), power down the IOT device, stop sending the message 130, or perform another action.

If the analysis indicates that "yes" spoofing is present, then the process may proceed to 716. At 716, the process may determine details about the spoofed GNSS data, such as which frequencies are being used by the spoofer, which constellations are being used by the spoofer, and other information related to the spoofed GNSS data. At 718, the process may determine in which sub-regions the spoofing is occurring, a threat level associated with the spoofing, a confidence level associated with the determination that spoofing is occurring, a location of the spoofer, and other spoofing-related information. At 720, the process may send a spoofing alert message to IOT devices and to user equipment (UE) devices. For example, in FIG. 1, if the server 104 determines that the results of the analysis satisfy particular criteria (e.g., 306, 308, 310, and 312 of FIG. 3), then the server 104 may send the spoofing alert 146 to the IOT devices 102 and to the user equipment 108. The spoofing alert 146 may provide details regarding the spoofed data 112 to enable the IOT devices 102 and the user equipment 108 to ignore the spoofed data 112. For example, the details may include which frequencies are used by the spoofed or which constellations are being used by the spoof or other details to enable the IOT devices 102 and the user equipment 108 to ignore the spoofed data 112. In this way, the user equipment 108 avoids the potentially disastrous consequences (e.g., incorrect navigation resulting in accidents, reaching an incorrect destination, or the like) of using the spoofed data 112. The server 104 may determine in which sub-regions the spoofed data 112 is present, a threat level associated with the spoofed data 112, a confidence level associated with the determination that the spoofed data 112 is present, a location of the spoofer 110, and other information associated with the spoofed data 112 and the spoofer 110.

Thus, when GNSS spoofing is not occurring, a server selects a subset of IOT devices to create a selected subset of IOT devices. When IOT devices send a warning message indicating possible spoofing to the server, the server analyzes the warning messages sent by IOT devices in the selected subset and ignores messages sent by IOT devices not included in the selected subset. Based on the warning messages sent by the selected subset of IOT devices, the server performs analysis to determine information, such as, for example, how many of the subset of IOT devices are sending the warning message, the ratio of IOT devices sending the warning message to the number of selected IOT devices, the number of IOT devices sending the warning message that are located in a particular sub-region of a region (e.g., a neighborhood in a city), whether the IOT devices have been sending the warning message for more than a threshold amount of time, and the like. The server may determine whether spoofing is occurring based on whether this information satisfies the set of spoofing conditions.

Figure 8:
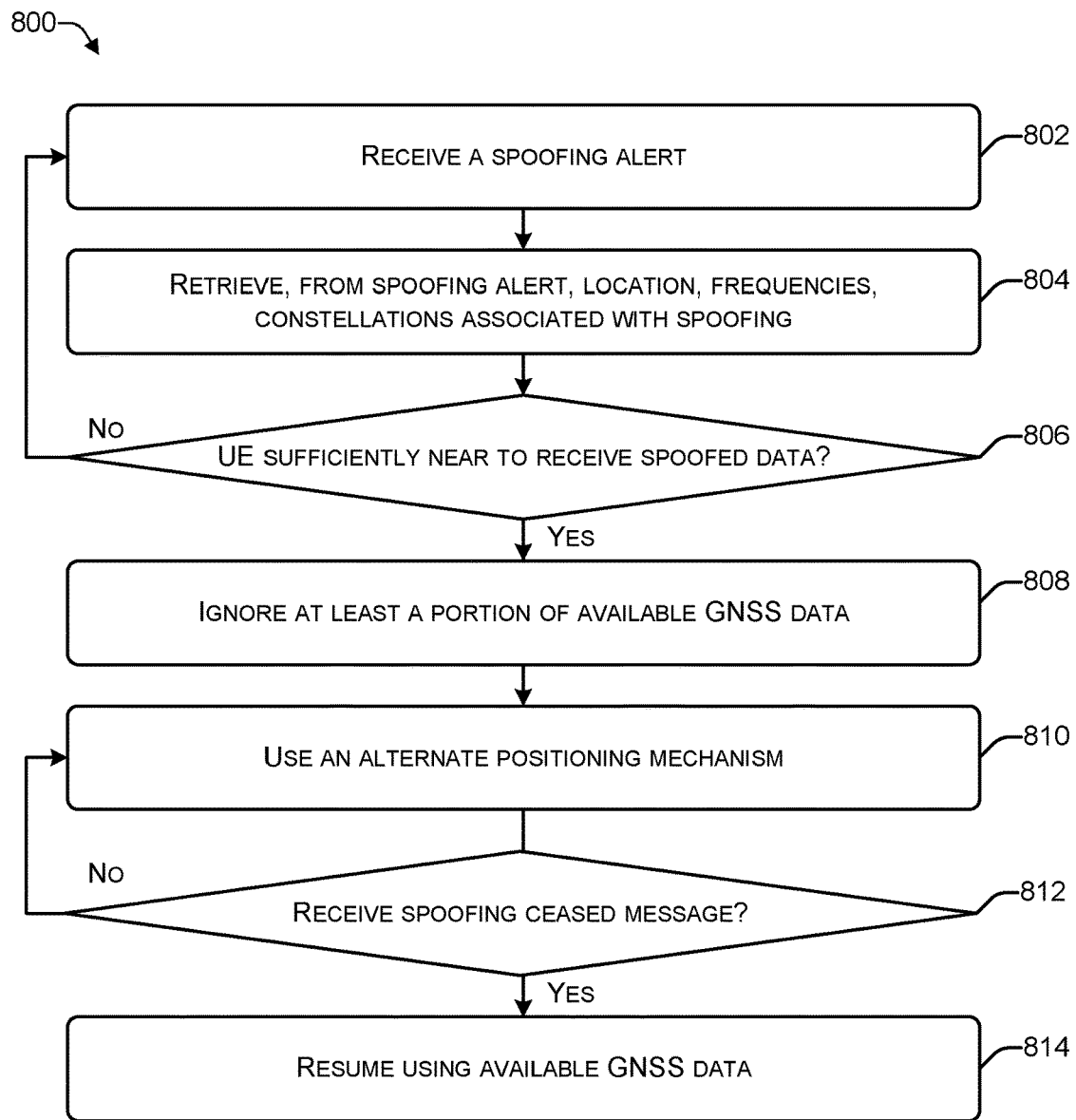
FIG. 8 illustrates an example process that includes receiving a spoofing alert, according to aspects of the disclosure.

FIG. 8 illustrates an example process 800 that includes receiving a spoofing alert, according to aspects of the disclosure. The process 800 may be performed by individual ones of the user equipment (UE) 108 of FIG. 1.

At 802, the process may receive a spoofing alert message. At 804, the process may retrieve, from the spoofing alert, a location (of the spoofer), frequencies (that are being used to transmit the spoofed data), and constellations associated with the spoofing. At 806, the process may determine whether the UE is sufficiently near the location of the spoof or to receive spoofed data. If a determination is made, at 806, that "no" the UE is not sufficiently close to the spoofer to receive the spoofed data, then the process goes back to 802. For example, in FIG. 1, the user equipment 108(1) may receive the spoofing alert 146 from the server 104 or the alert 150 from one of the IOT devices 102. The user equipment 108(1) may retrieve (e.g., from the alert 146 or alert 150) data associated with the spoofing, such as a location of the spoofer, frequencies that are being used to transmit the spoofed data, and constellations associated with the spoofing. If the user equipment 108(1) determines that the location of the spoofer 110 is sufficiently far from the user equipment 108(1) that the user equipment 108(1) cannot receive the spoofed data 112, then the user equipment 108(1) may continue using the available GNSS data 168.

If a determination is made, at 806 that "yes" the UE is sufficiently close to the spoofer to receive the spoofed data, then the process proceeds to 808. At 808, the process ignores at least a portion of the available GNSS data. At 810, the process may use an alternate positioning mechanism. For example, in FIG. 1, if the user equipment 108(1) determines that the spoofer 110 is sufficiently close that the user equipment 108(1) is capable of receiving the spoofed data 112, then the user equipment 108(1) may ignore the spoofed data 112. The user equipment 108(1) may use an alternate mechanism to determine its position/location. For example, the user equipment 108(1) may use a position determined prior to receiving the alert 146 or the alert 150 along with sensor data from other sensors (e.g., a gyroscope, an accelerometer, a magnetic compass, a mapping sensor, or the like) to extrapolate a current position based on the previously determined position and the sensor data.

At 812, the process may determine whether a spoofing ceased message has been received. If the process determines, at 812, that the spoofing ceased message has not been received, then the process proceeds back to 810. If the process determines, at 812 that the spoofing ceased message has been received, then the process proceeds to 814. At 814, the process resumes using available GNSS data. For example, in FIG. 1, the user equipment 108(1) may continue to ignore the spoofed data 112 until the server 104 sends the spoofing ceased 156 message indicating that the spoofed data 112 is no longer present.

Figure 9:
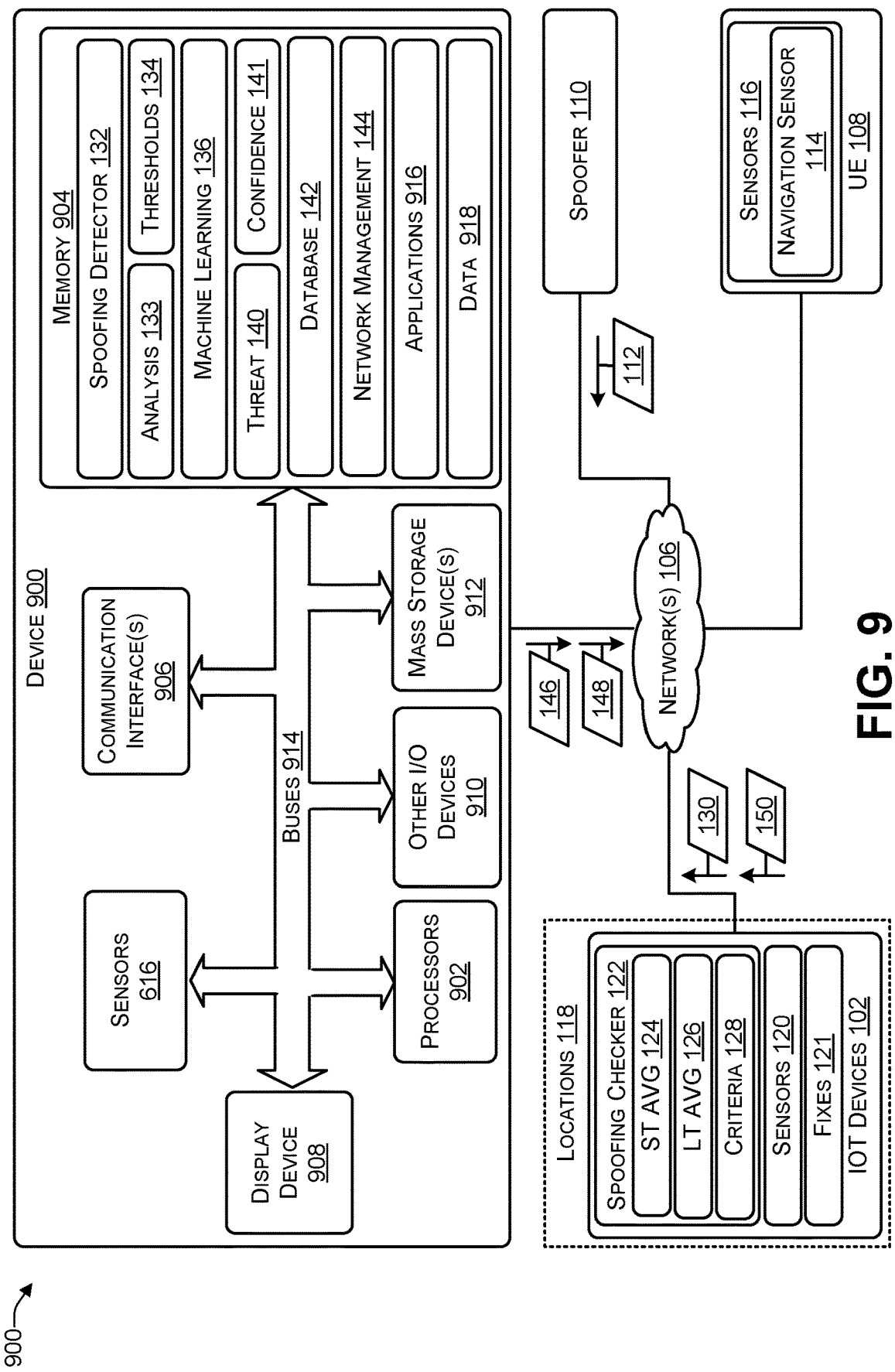
FIG. 9 illustrates a communications system, in accordance with an aspect of the disclosure.

FIG. 9 illustrates a device 900 to implement server 104, the IOT devices 102, or the UE 108, in accordance with an aspect of the disclosure. The device 900 may include one or more processors 902 (e.g., CPU, GPU, or the like), a memory 904, communication interfaces 906, a display device 908, other input/output (I/O) devices 910 (e.g., keyboard, trackball, and the like), and one or more mass storage devices 912 (e.g., disk drive, solid state disk drive, or the like), configured to communicate with each other, such as via one or more system buses 914 or other suitable connections. While a single system bus 914 is illustrated for ease of understanding, it should be understood that the system buses 914 may include multiple buses, such as a memory device bus, a storage device bus (e.g., serial ATA (SATA) and the like), data buses (e.g., universal serial bus (USB) and the like), video signal buses (e.g., THUNDERBOLT®, DVI, HDMI, and the like), power buses, etc.

The processors 902 are one or more hardware devices that may include a single processing unit or a number of processing units, all of which may include single or multiple computing units or multiple cores. The processors 902 may include a graphics processing unit (GPU) that is integrated into the CPU or the GPU may be a separate processor device from the CPU. The processors 902 may be implemented as one or more microprocessors, microcomputers, microcontrollers, digital signal processors, central processing units, graphics processing units, state machines, logic circuitries, and/or any devices that manipulate signals based on operational instructions. Among other capabilities, the processors 902 may be configured to fetch and execute computer-readable instructions stored in the memory 904, mass storage devices 912, or other computer-readable media.

Memory 904 and mass storage devices 912 are examples of computer storage media (e.g., memory storage devices) for storing instructions that can be executed by the processors 902 to perform the various functions described herein. For example, memory 904 may include both volatile memory and non-volatile memory (e.g., RAM, ROM, or the like) devices. Further, mass storage devices 912 may include hard disk drives, solid-state drives, removable media, including external and removable drives, memory cards, flash memory, floppy disks, optical disks (e.g., CD, DVD), a storage array, a network attached storage, a storage area network, or the like. Both memory 904 and mass storage devices 912 may be collectively referred to as memory or computer storage media herein and may be any type of non-transitory media capable of storing computer-readable, processor-executable program instructions as computer program code that can be executed by the processors 902 as a particular machine configured for carrying out the operations and functions described in the implementations herein.

The device 900 may include one or more communication interfaces 906 for exchanging data. The communication interfaces 906 can facilitate communications within a wide variety of networks and protocol types, including wired networks (e.g., Ethernet, DOCSIS, DSL, Fiber, USB etc.) and wireless networks (e.g., WLAN, GSM, CDMA, 802.11, Bluetooth, Wireless USB, ZigBee, cellular, satellite, etc.), the Internet and the like. Communication interfaces 906 can also provide communication with external storage, such as a storage array, network attached storage, storage area network, cloud storage, or the like.

The display device 908 may be used for displaying content (e.g., information and images) to users. Other I/O devices 910 may be devices that receive various inputs from a user and provide various outputs to the user, and may include a keyboard, a touchpad, a mouse, a printer, audio input/output devices, and so forth.

The computer storage media, such as memory 904 and mass storage devices 912, may be used to store software and data. For example, the computer storage media may be used to store the spoofing detector 132, the analysis module 133, the conditions 134, the machine learning 136, the threat level 140 (including confidence level), the database 142, the network management 144, other applications 916, and other data 918.

Figure 10A:
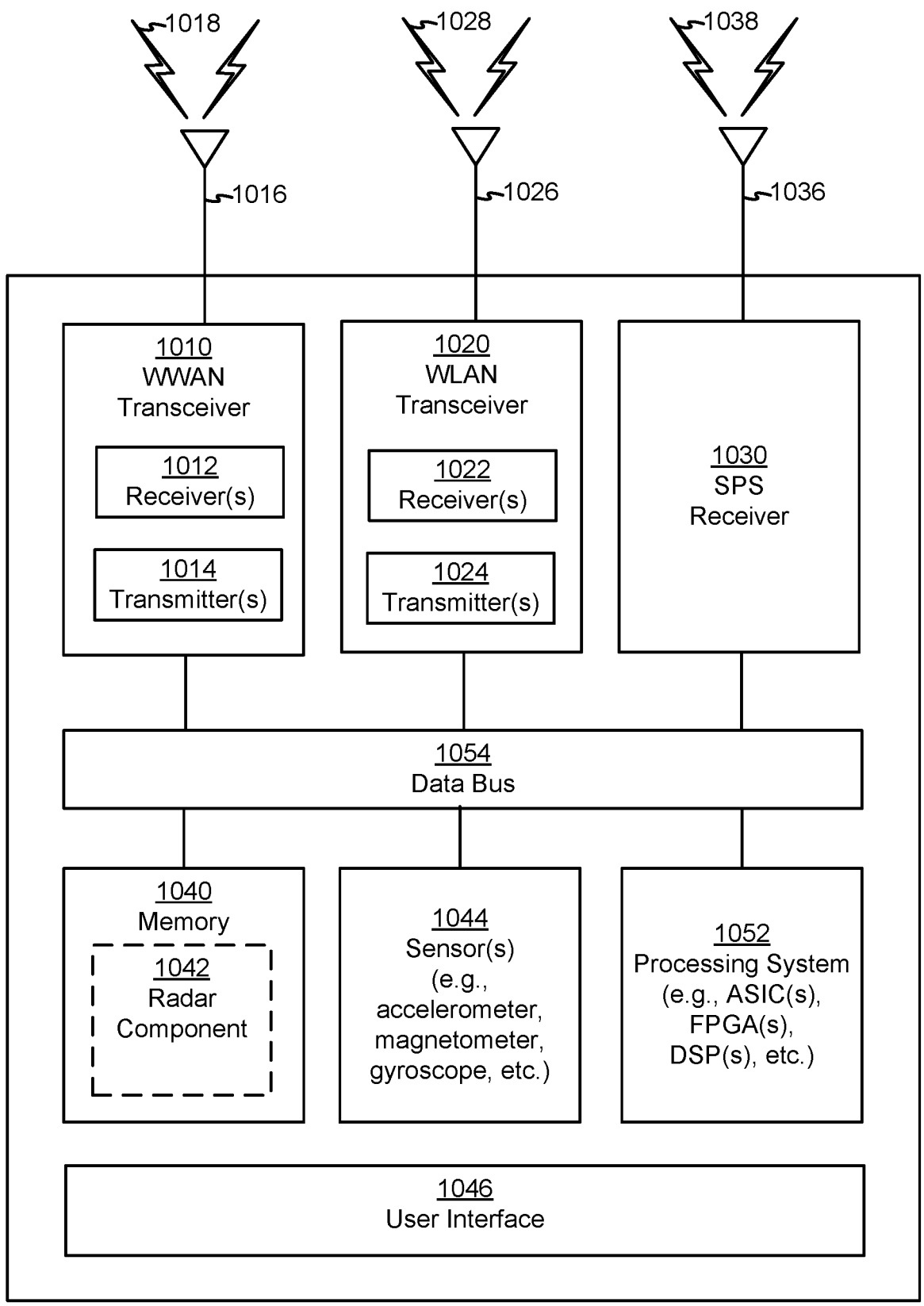
FIGS. 10A and 10B are simplified block diagrams of several sample aspects of components that may be employed in wireless communication nodes and configured to support communication as described herein.
Figure 10B:
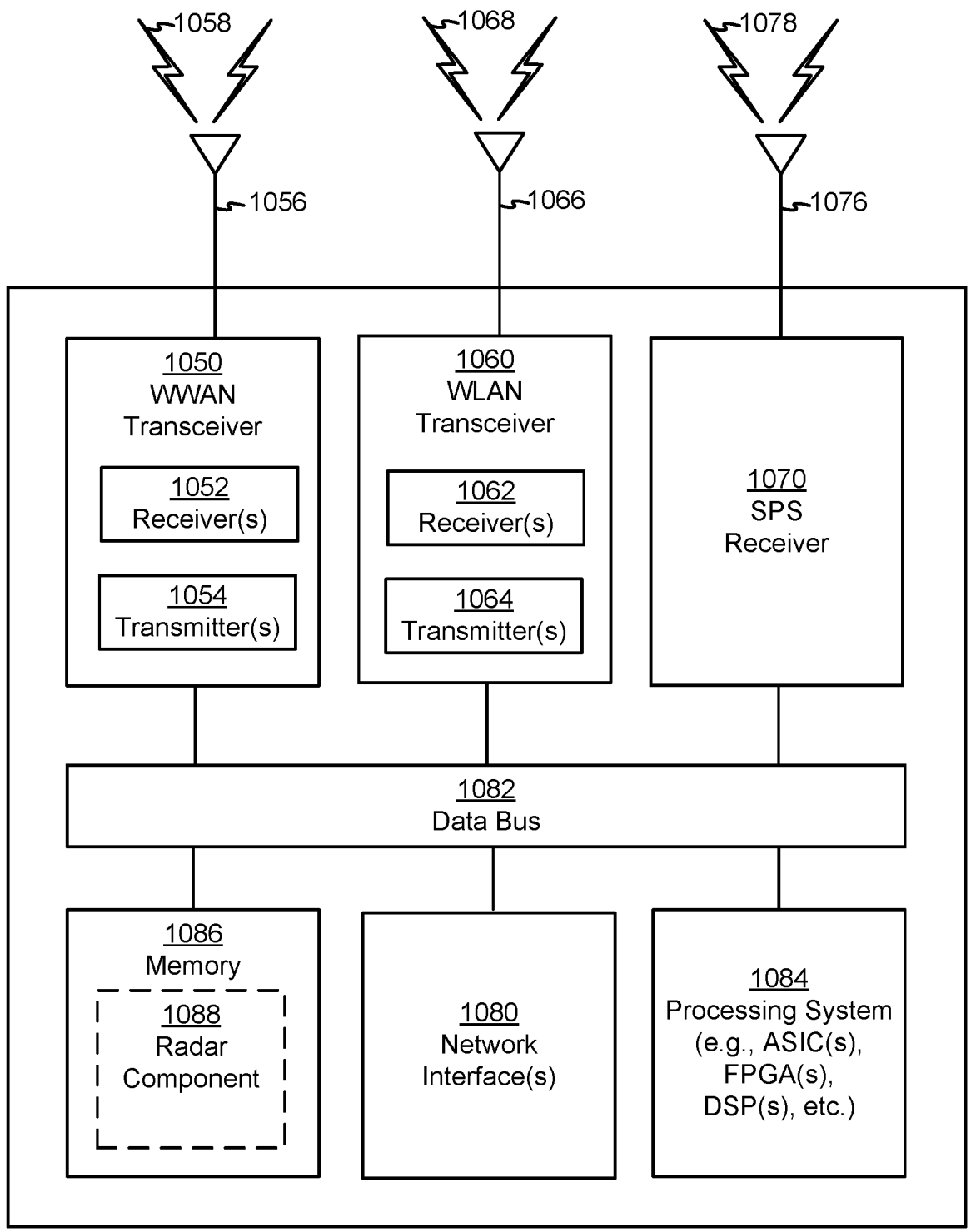

Referring to FIGS. 10A and 10B, several example components (represented by corresponding blocks) that may be incorporated into a UE, a base station (which may correspond to any of the base stations described herein), and a network entity (which may correspond to or embody any of the network functions described herein) to support the file transmission operations are shown. It will be appreciated that these components may be implemented in different types of apparatuses in different implementations (e.g., in an ASIC, in a system-on-chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The UE, base station, or network entity may include wireless wide area network (WWAN) transceiver 1010 and 1050, respectively, configured to communicate via one or more wireless communication networks (not shown), such as an NR network, an LTE network, a GSM network, and/or the like. The WWAN transceivers 1010 and 1050 may be connected to one or more antennas 1016 and 1056, respectively, for communicating with other network nodes, such as other UEs, access points, base stations (e.g., eNBs, gNBs), etc., via at least one designated RAT (e.g., NR, LTE, GSM, etc.) over a wireless communication medium of interest (e.g., some set of time/frequency resources in a particular frequency spectrum). The WWAN transceivers 1010 and 1050 may be variously configured for transmitting and encoding signals 1018 and 1058 (e.g., messages, indications, information, and so on), respectively, and, conversely, for receiving and decoding signals 1018 and 1058 (e.g., messages, indications, information, pilots, and so on), respectively, in accordance with the designated RAT. Specifically, the transceivers 1010 and 1050 include one or more transmitters 1014 and 1054, respectively, for transmitting and encoding signals 1018 and 1058, respectively, and one or more receivers 1012 and 1052, respectively, for receiving and decoding signals 1018 and 1058, respectively.

The UE and the base station also include, at least in some cases, wireless local area network (WLAN) transceivers 1020 and 1060, respectively. The WLAN transceivers 1020 and 1060 may be connected to one or more antennas 1026 and 1066, respectively, for communicating with other network nodes, such as other UEs, access points, base stations, etc., via at least one designated RAT (e.g., WiFi, LTE-D, Bluetooth®, etc.) over a wireless communication medium of interest. The WLAN transceivers 1020 and 1060 may be variously configured for transmitting and encoding signals 1028 and 1068 (e.g., messages, indications, information, and so on), respectively, and, conversely, for receiving and decoding signals 1028 and 1068 (e.g., messages, indications, information, pilots, and so on), respectively, in accordance with the designated RAT. Specifically, the transceivers 1020 and 1060 include one or more transmitters 1024 and 1064, respectively, for transmitting and encoding signals 1028 and 1068, respectively, and one or more receivers 1022 and 1062, respectively, for receiving and decoding signals 1028 and 1068, respectively.

Transceiver circuitry including at least one transmitter and at least one receiver may comprise an integrated device (e.g., embodied as a transmitter circuit and a receiver circuit of a single communication device) in some implementations, may comprise a separate transmitter device and a separate receiver device in some implementations, or may be embodied in other ways in other implementations. In an aspect, a transmitter may include or be coupled to a plurality of antennas (e.g., antennas 1016, 1026, 1056, 1066), such as an antenna array, that permits the respective apparatus to perform transmit "beamforming," as described herein. Similarly, a receiver may include or be coupled to a plurality of antennas (e.g., antennas 1016, 1026, 1056, 1066), such as an antenna array, that permits the respective apparatus to perform receive beamforming, as described herein. In an aspect, the transmitter and receiver may share the same plurality of antennas (e.g., antennas 1016, 1026, 1056, 1066), such that the respective apparatus can only receive or transmit at a given time, not both at the same time. A wireless communication device (e.g., one or both of the transceivers 1010 and 1020 and/or 1050 and 1060) of the UE and/or the base station may also comprise a network listen module (NLM) or the like for performing various measurements.

The UE and the base station may include, at least in some cases, satellite positioning systems (SPS) receivers 1030 and 1070. The SPS receivers 1030 and 1070 may be connected to one or more antennas 1036 and 1076, respectively, for receiving SPS signals 1038 and 1078, respectively, such as Global Positioning System (GPS) signals, GLObal NAvigation Satellite System (GLONASS) signals, Galileo signals, Beidou signals, Indian Regional Navigation Satellite System (NAVIC), Quasi-Zenith Satellite System (QZSS), etc. The SPS receivers 1030 and 1070 may comprise any suitable hardware and/or software for receiving and processing SPS signals 1038 and 1078, respectively. The SPS receivers 1030 and 1070 request information and operations as appropriate from the other systems, and performs calculations necessary to determine positions of the UE and the base station using measurements obtained by any suitable SPS algorithm.

The base station and the network entity may each include at least one network interface 1080 for communicating with other network entities. For example, the network interfaces 1080 (e.g., one or more network access ports) may be configured to communicate with one or more network entities via a wire-based or wireless backhaul connection. In some aspects, the network interfaces 1080 may be implemented as transceivers configured to support wire-based or wireless signal communication. This communication may involve, for example, sending and receiving messages, parameters, and/or other types of information.

The UE, the base station, and the network entity may include other components that may be used in conjunction with the operations as disclosed herein. The UE may include processor circuitry implementing a processing system 1052 for providing functionality relating to, for example, RF sensing, and for providing other processing functionality. The base station may include a processing system 1084 for providing functionality relating to, for example, RF sensing as disclosed herein, and for providing other processing functionality. The network entity may include a processing system for providing functionality relating to, for example, Wi-Fi radar or RF sensing as disclosed herein, and for providing other processing functionality. In an aspect, the processing systems 1052, 1084 may include, for example, one or more general purpose processors, multi-core processors, ASICs, digital signal processors (DSPs), field programmable gate arrays (FPGA), or other programmable logic devices or processing circuitry.

The UE, the base station, and the network entity may include memory circuitry implementing memory components 1040, 1086 (e.g., each including a memory device), respectively, for maintaining information (e.g., information indicative of reserved resources, thresholds, parameters, and so on). In some cases, the UE, the base station, and the network entity may include radar components 1042, 1088, respectively. The radar components 1042, 1088 may be hardware circuits that are part of or coupled to the processing systems 1052, 1084 respectively, that, when executed, cause the UE, the base station, and the network entity to perform the functionality described herein. In other aspects, the radar components 1042, 1088 may be external to the processing systems 1052, 1084 (e.g., part of a modem processing system, integrated with another processing system, etc.). Alternatively, the radar components 1042, 1088 may be memory modules (as shown in FIGS. 10A, 10B) stored in the memory components 1040, 1086 respectively, that, when executed by the processing systems 1052, 1084 (or a modem processing system, another processing system, etc.), cause the UE, the base station, and the network entity to perform the functionality described herein.

The UE may include one or more sensors 1044 coupled to the processing system 1052 to provide movement and/or orientation information that is independent of motion data derived from signals received by the WWAN transceiver 1010, the WLAN transceiver 1020, and/or the SPS receiver 1030. By way of example, the sensor(s) 1044 may include an accelerometer (e.g., a micro-electrical mechanical system (MEMS) device), a gyroscope, a geomagnetic sensor (e.g., a compass), an altimeter (e.g., a barometric pressure altimeter), and/or any other type of movement detection sensor. Moreover, the sensor(s) 1044 may include a plurality of different types of devices and combine their outputs in order to provide motion information. For example, the sensor(s) 1044 may use a combination of a multi-axis accelerometer and orientation sensors to provide the ability to compute positions in 2D and/or 3D coordinate systems.

In addition, the UE may include a user interface 1046 for providing indications (e.g., audible and/or visual indications) to a user and/or for receiving user input (e.g., upon user actuation of a sensing device such a keypad, a touch screen, a microphone, and so on). Although not shown, the base station and the network entity may also include user interfaces.

Referring to the processing system 1084 in more detail, in the downlink, IP packets from the network entity may be provided to the processing system 1084. The processing system 1084 may implement functionality for an RRC layer, a packet data convergence protocol (PDCP) layer, a radio link control (RLC) layer, and a medium access control (MAC) layer. The processing system 1084 may provide RRC layer functionality associated with broadcasting of system information (e.g., master information block (MIB), system information blocks (SIB s)), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through automatic repeat request (ARQ), concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmitter 1054 and the receiver 1052 may implement Layer-1 functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The transmitter 1054 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency division multiplexing (OFDM) subcarrier, multiplexed with a reference signal (e.g., pilot) in the time and/or frequency domain, and then combined together using an inverse fast Fourier transform (IFFT) to produce a physical channel carrying a time domain OFDM symbol stream. The OFDM symbol stream is spatially precoded to produce multiple spatial streams. Channel estimates from a channel estimator may be used to determine the coding and modulation scheme, as well as for spatial processing. The channel estimate may be derived from a reference signal and/or channel condition feedback transmitted by the UE. Each spatial stream may then be provided to one or more different antennas 1056. The transmitter 1054 may modulate an RF carrier with a respective spatial stream for transmission.

At the UE, the receiver 1012 receives a signal through its respective antenna(s) 1016. The receiver 1012 recovers information modulated onto an RF carrier and provides the information to the processing system 1052. The transmitter 1014 and the receiver 1012 implement Layer-1 functionality associated with various signal processing functions. The receiver 1012 may perform spatial processing on the information to recover any spatial streams destined for the UE. If multiple spatial streams are destined for the UE, they may be combined by the receiver 1012 into a single OFDM symbol stream. The receiver 1012 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station. These soft decisions may be based on channel estimates computed by a channel estimator. The soft decisions are then decoded and de-interleaved to recover the data and control signals that were originally transmitted by the base station on the physical channel. The data and control signals are then provided to the processing system 1052, which implements Layer-3 and Layer-2 functionality.

In the uplink, the processing system 1052 provides demultiplexing between transport and logical channels, packet reassembly, deciphering, header decompression, and control signal processing to recover IP packets from the core network. The processing system 1052 is also responsible for error detection.

Similar to the functionality described in connection with the downlink transmission by the base station, the processing system 1052 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through hybrid automatic repeat request (HARQ), priority handling, and logical channel prioritization.

Channel estimates derived by the channel estimator from a reference signal or feedback transmitted by the base station may be used by the transmitter 1014 to select the appropriate coding and modulation schemes, and to facilitate spatial processing. The spatial streams generated by the transmitter 1014 may be provided to different antenna(s) 1016. The transmitter 1014 may modulate an RF carrier with a respective spatial stream for transmission.

The uplink transmission is processed at the base station in a manner similar to that described in connection with the receiver function at the UE. The receiver 1052 receives a signal through its respective antenna(s) 1056. The receiver 1052 recovers information modulated onto an RF carrier and provides the information to the processing system 1084.

In the uplink, the processing system 1084 provides demultiplexing between transport and logical channels, packet reassembly, deciphering, header decompression, control signal processing to recover IP packets from the UE. IP packets from the processing system 1084 may be provided to the core network. The processing system 1084 is also responsible for error detection.

For convenience, the UE, the base station, and/or the network entity are shown in FIGS. 10A, 10B as including various components that may be configured according to the various examples described herein. It will be appreciated, however, that the illustrated blocks may have different functionality in different designs.

The various components of the UE, the base station, and the network entity may communicate with each other over data buses 1054, 1082 respectively. The components of FIGS. 10A, 10B may be implemented in various ways. In some implementations, the components of FIGS. 10A, 10B may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 1010 to 1046 may be implemented by processor and memory component(s) of the UE (e.g., by execution of appropriate code and/or by appropriate configuration of processor components). Similarly, some or all of the functionality represented by blocks 1050 to 1088 may be implemented by processor and memory component(s) of the base station (e.g., by execution of appropriate code and/or by appropriate configuration of processor components). For simplicity, various operations, acts, and/or functions are described herein as being performed "by a UE," "by a base station," "by a positioning entity," etc. However, as will be appreciated, such operations, acts, and/or functions may actually be performed by specific components or combinations of components of the UE, base station, positioning entity, etc., such as the processing systems 1052, 1084 the transceivers 1010, 1020, 1050, and 1060, the memory components 1040, 1086 the radar components 1042, 1088 etc.

It can be noted that, although particular frequencies, integrated circuits (ICs), hardware, and other features are described in the aspects herein, alternative aspects may vary. That is, alternative aspects may utilize additional or alternative frequencies (e.g., other the 60 GHz and/or 28 GHz frequency bands), antenna elements (e.g., having different size/shape of antenna element arrays), scanning periods (including both static and dynamic scanning periods), electronic devices (e.g., WLAN APs, cellular base stations, smart speakers, IoT devices, mobile phones, tablets, personal computer (PC), etc.), and/or other features. A person of ordinary skill in the art will appreciate such variations.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of A, B, or C" or "one or more of A, B, or C" or "at least one of the group consisting of A, B, and C" used in the description or the claims means "A or B or C or any combination of these elements." For example, this terminology may include A, or B, or C, or A and B, or A and C, or A and B and C, or 2A, or 2B, or 2C, and so on.

In view of the descriptions and explanations above, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Accordingly, it will be appreciated, for example, that an apparatus or any component of an apparatus may be configured to (or made operable to or adapted to) provide functionality as taught herein. This may be achieved, for example: by manufacturing (e.g., fabricating) the apparatus or component so that it will provide the functionality; by programming the apparatus or component so that it will provide the functionality; or through the use of some other suitable implementation technique. As one example, an integrated circuit may be fabricated to provide the requisite functionality. As another example, an integrated circuit may be fabricated to support the requisite functionality and then configured (e.g., via programming) to provide the requisite functionality. As yet another example, a processor circuit may execute code to provide the requisite functionality.

Moreover, the methods, sequences, and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An example storage medium is coupled to the processor such that the processor can read information from, and write information to, the storage medium. In the alternative, the storage medium may be integral to the processor (e.g., cache memory).

In the detailed description above it can be seen that different features are grouped together in examples. This manner of disclosure should not be understood as an intention that the example clauses have more features than are explicitly mentioned in each clause. Rather, the various aspects of the disclosure may include fewer than all features of an individual example clause disclosed. Therefore, the following clauses should hereby be deemed to be incorporated in the description, wherein each clause by itself can stand as a separate example. Although each dependent clause in the clauses can refer to a specific combination with one of the other clauses, the aspect(s) of that dependent clause are not limited to the specific combination. It will be appreciated that other example clauses can also include a combination of the dependent clause aspect(s) with the subject matter of any other dependent clause or independent clause or a combination of any feature with other dependent and independent clauses. The various aspects disclosed herein expressly include these combinations, unless it is explicitly expressed or can be readily inferred that a specific combination is not intended (e.g., contradictory aspects, such as defining an element as both an insulator and a conductor). Furthermore, it is also intended that aspects of a clause can be included in any other independent clause, even if the clause is not directly dependent on the independent clause. Implementation examples are described in the following numbered clauses:

Clause 1. A method of operating a server comprising: receiving a warning message from a monitored device in a set of monitored devices, the warning message comprising Global Navigation Satellite System (GNSS) measurement data; determining, based at least in part on an analysis of the GNSS measurement data, whether a spoofed GNSS condition is present; and based on the determining, sending a spoofing alert message to one or more user equipments (UEs).

Clause 2. The method of clause 1, wherein: the spoofed GNSS condition is determined to be absent and the spoofing alert message provides an indication that the spoofed GNSS condition is not present, or the spoofed GNSS condition is determined to be present and the spoofing alert message provides an indication that the spoofed GNSS condition is present.

Clause 3. The method of clause 2, wherein determining that the spoofed GNSS condition is present comprises: determining that a number of monitored devices sending the warning message is greater than a number threshold; determining that a percentage of the number of monitored devices sending the warning message to a total number of monitored devices is greater than a percentage threshold; determining that a size of a sub-region in which monitored devices are sending the warning message is greater than a size threshold; and determining that a length of time during which the monitored devices are sending the warning message is greater than a time threshold.

Clause 4. The method of clause 3, wherein the spoofing alert message comprises at least one of: a spoofed constellation used by a spoofed GNSS signal; and a frequency used by the spoofed GNSS signal.

Clause 5. The method of any of clauses 2 to 4, wherein determining that the spoofed GNSS condition is absent comprises: determining that a difference between a short-term average of GNSS fixes, and a long-term average of GNSS fixes, is less than a difference threshold for a number of the set of monitored devices as a percentage of a total number of the set of monitored devices is greater than a percentage threshold.

Clause 6. The method of any of clauses 1 to 5, further comprising: determining that the spoofed GNSS condition is absent; determining that for a particular device of a plurality of devices: a difference between a short-term average of a first plurality of Global Navigation Satellite System fixes, and a long-term average of a second plurality of Global Navigation Satellite System fixes, is less than or equal to a difference threshold; and a horizontal estimated position error is less than or equal to an error threshold; and including the particular device in the set of monitored devices.

Clause 7. The method of any of clauses 1 to 6, wherein the warning message comprises: a short-term average of a first plurality of GNSS fixes determined by the monitored device; a long-term average of a second plurality of GNSS fixes determined by the monitored device; a difference between the short-term average and the long-term average; and a horizontal estimated position error determined by the monitored device.

Clause 8. The method of any of clauses 1 to 7, further comprising: receiving a second warning message from a second monitored device in the set of monitored devices, the second warning message comprising second GNSS measurement data; determining, based at least in part on the second GNSS measurement data, that the second monitored device is defective; and removing the second monitored device from the set of monitored devices.

Clause 9. The method of clause 8, further comprising: sending an instruction to the second monitored device, the instruction comprising one of either: a first instruction to disable a navigation sensor of the second monitored device; or a second instruction to transition the second monitored device to a low-power mode.

Clause 10. The method of any of clauses 1 to 9, further comprising: determining a weighted average of a long-term average of GNSS fixes for each monitored device sending the warning message, wherein a weight for each device is based on a difference between: a short-term average of GNSS fixes determined by the monitored devices sending the warning message, and a long-term average of GNSS fixes determined by the monitored devices sending the warning message; and determining an approximate location of a spoofer that is transmitting the spoofed GNSS signal based on the weighted average of the long-term average of GNSS fixes.

Clause 11. A method of operating a device, comprising: measuring one or more Global Navigation Satellite System (GNSS) signals to obtain GNSS measurement data; determining that one or more GNSS spoofing criteria associated with the GNSS measurement data are satisfied; and transmitting, to a server, a warning message associated with the GNSS measurement data to alert the server to potential GNSS spoofing.

Clause 12. The method of clause 11, wherein determining that the one or more GNSS spoofing criteria associated with the GNSS measurement data are satisfied comprises: determining a current GNSS fix based on the one or more GNSS signals; updating GNSS fix data to include the current GNSS fix; determining, based on the GNSS fix data, a short-term average of GNSS fixes; determining, based on the GNSS fix data, a long-term average of GNSS fixes; determining a difference between the short-term average of GNSS fixes and the long-term average of GNSS fixes; determining that the difference satisfies a first threshold for at least a particular duration; determining, based on the current GNSS fix, a horizontal estimated position error (HEPE); and determining that the HEPE satisfies a second threshold for at least the particular duration.

Clause 13. The method of clause 12, wherein: the short-term average of GNSS fixes is determined for a time period of between 10 seconds to 60 seconds.

Clause 14. The method of any of clauses 12 to 13, wherein: the long-term average of GNSS fixes is determined for a time period of between 1 day to 30 days.

Clause 15. The method of any of clauses 11 to 14, further comprising: receiving a spoofing alert message from the server indicating a presence of a spoofed GNSS signal.

Clause 16. The method of clause 15, wherein the spoofing alert message includes at least one of: a frequency associated with a spoofed signal, or a constellation associated with a spoofed signal.

Clause 17. The method of any of clauses 15 to 16, further comprising: ignoring the spoofed GNSS signal.

Clause 18. The method of any of clauses 15 to 17, further comprising: determining that one or more user equipments (UEs) are receiving the spoofed GNSS signal; and sending the spoofing alert message to at least one UE of the one or more UEs.

Clause 19. The method of any of clauses 11 to 18, further comprising: receiving an instruction from the server to perform at least one of: taking offline a particular sensor associated with the device; stopping sending the warning message to the server; or powering down the device.

Clause 20. A method of operating a user equipment, comprising: receiving a spoofing alert message comprising an indication that a spoofed Global Navigation Satellite System (GNSS) condition is present, a location of a spoofer broadcasting a spoofed GNSS signal, and an indication of a spoofed zone; and determining that the spoofing alert message indicates that a spoofed GNSS condition is present; determining, based on the spoofing alert message, a location of a spoofer broadcasting a spoofed GNSS signal; determining, based on the location of the spoofer and a current location of the user equipment, that the user equipment is within a receiving area of the spoofed GNSS signal; and determining a position of the user equipment without using the spoofed GNSS signal.

Clause 21. The method of clause 20, wherein the spoofing alert message comprises: one or more constellations associated with the spoofed GNSS signal.

Clause 22. The method of any of clauses 20 to 21, wherein the spoofing alert message comprises: one or more frequencies associated with the spoofed GNSS signal.

Clause 23. The method of any of clauses 20 to 22, wherein determining the position of the user equipment without using the spoofed GNSS signal comprises: retrieving a previously determined position that was determined before receiving the spoofing alert message; determining sensor data from one or more sensors of the user equipment, the one or more sensors comprising a magnetometer, a gyroscope, and an accelerometer; and determining a current position of the user equipment based at least in part on the previously determined position and the sensor data.

Clause 24. The method of any of clauses 20 to 23, further comprising: based on determining that the spoofing alert message indicates that a spoofed GNSS condition is absent, determining a position of the user equipment using one or more GNSS signals.

Clause 25. An apparatus comprising a memory, at least one transceiver, and at least one processor communicatively coupled to the memory and the at least one transceiver, the memory, the at least one transceiver, and the at least one processor configured to perform a method according to any of clauses 1 to 24.

Clause 26. An apparatus comprising means for performing a method according to any of clauses 1 to 24.

Clause 27. A non-transitory computer-readable medium storing computer-executable instructions, the computer-executable comprising at least one instruction for causing a computer or processor to perform a method according to any of clauses 1 to 24.

While the foregoing disclosure shows various illustrative aspects, it should be noted that various changes and modifications may be made to the illustrated examples without departing from the scope defined by the appended claims. The present disclosure is not intended to be limited to the specifically illustrated examples alone. For example, unless otherwise noted, the functions, steps, and/or actions of the method claims in accordance with the aspects of the disclosure described herein need not be performed in any particular order. Furthermore, although certain aspects may be described or claimed in the singular, the plural is contemplated unless limitation to the singular is explicitly stated.

What is claimed is:

1. A method of operating a device, comprising:
   receiving one or more Global Navigation Satellite System (GNSS) signals;
   measuring the one or more GNSS signals to obtain GNSS measurement data;
   determining that one or more GNSS spoofing criteria associated with the GNSS measurement data are satisfied; and
   transmitting, to a server, a warning message associated with the GNSS measurement data to alert the server to potential GNSS spoofing,
   wherein determining that the one or more GNSS spoofing criteria associated with the GNSS measurement data are satisfied comprises:
   determining a current GNSS fix based on the one or more GNSS signals;
   updating GNSS fix data to include the current GNSS fix;
   determining, based on the GNSS fix data, a short-term average of GNSS fixes;
   determining, based on the GNSS fix data, a long-term average of GNSS fixes;
   determining a difference between the short-term average of GNSS fixes and the long-term average of GNSS fixes;
   determining that the difference satisfies a first threshold for at least a first duration;
   determining, based on the current GNSS fix, a horizontal estimated position error (HEPE); and
   determining that the HEPE satisfies a second threshold for at least the first duration.

2. The method of claim 1, wherein:
   the short-term average of GNSS fixes is determined for a time period of between 10 seconds to 60 seconds.

3. The method of claim 1, wherein:
   the long-term average of GNSS fixes is determined for a time period of between 1 day to 30 days.

4. The method of claim 1, further comprising:
   receiving a spoofing alert message from the server indicating a presence of a spoofed GNSS signal.

5. The method of claim 4, wherein the spoofing alert message includes at least one of:
   a frequency associated with a spoofed signal, or
   a constellation associated with a spoofed signal.

6. The method of claim 4, further comprising:
   ignoring the spoofed GNSS signal.

7. The method of claim 4, further comprising:
   determining that one or more user equipments (UEs) are receiving the spoofed GNSS signal; and
   sending the spoofing alert message to at least one UE of the one or more UEs.

8. The method of claim 1, further comprising:
   receiving an instruction from the server to perform at least one of:
   taking offline a particular sensor associated with the device;
   stopping sending the warning message to the server; or
   powering down the device.

9. A device, comprising:
   one or more memories; and
   one or more processors communicatively coupled to the one or more memories, and configured to:

receive one or more Global Navigation Satellite System (GNSS) signals;

measure the one or more GNSS signals to obtain GNSS measurement data;

determine that one or more GNSS spoofing criteria associated with the GNSS measurement data are satisfied; and transmit, to a server, a warning message associated with the GNSS measurement data to alert the server to potential GNSS spoofing, wherein the one or more processors configured to determine that the one or more GNSS spoofing criteria associated with the GNSS measurement data are satisfied comprises the one or more processors configured to:

determine a current GNSS fix based on the one or more GNSS signals;

update GNSS fix data to include the current GNSS fix;

determine, based on the GNSS fix data, a short-term average of GNSS fixes;

determine, based on the GNSS fix data, a long-term average of GNSS fixes;

determine a difference between the short-term average of GNSS fixes and the long-term average of GNSS fixes;

determine that the difference satisfies a first threshold for at least a first duration;

determine, based on the current GNSS fix, a horizontal estimated position error (HEPE); and determine that the HEPE satisfies a second threshold for at least the first duration.

10. The device of claim 9, wherein:
the short-term average of GNSS fixes is determined for a time period of between 10 seconds to 60 seconds.

11. The device of claim 9, wherein:
the long-term average of GNSS fixes is determined for a time period of between 1 day to 30 days.

12. The device of claim 9, wherein the one or more processors are further configured to:
receive a spoofing alert message from the server indicating a presence of a spoofed GNSS signal.

13. The device of claim 12, wherein the spoofing alert message includes at least one of:
a frequency associated with a spoofed signal, or
a constellation associated with a spoofed signal.

14. The device of claim 12, wherein the one or more processors are further configured to:
ignore the spoofed GNSS signal.

15. The device of claim 12, wherein the one or more processors are further configured to:
determine that one or more user equipments (UEs) are receiving the spoofed GNSS signal; and
send the spoofing alert message to at least one UE of the one or more UEs.

16. The device of claim 9, further comprising:
receive an instruction from the server to perform at least one of:
    taking offline a particular sensor associated with the device;
    stopping sending the warning message to the server; or
    powering down the device.

17. A non-transitory computer-readable medium storing computer-executable instructions that, when executed by a device, cause the device to:

receive one or more Global Navigation Satellite System (GNSS) signals;

measure the one or more GNSS signals to obtain GNSS measurement data;

determine that one or more GNSS spoofing criteria associated with the GNSS measurement data are satisfied; and transmit, to a server, a warning message associated with the GNSS measurement data to alert the server to potential GNSS spoofing, wherein the computer-executable instructions that, when executed by the device, cause the device to determine that the one or more GNSS spoofing criteria associated with the GNSS measurement data are satisfied comprise computer-executable instructions that, when executed by the device, cause the device to:

determine a current GNSS fix based on the one or more GNSS signals;

update GNSS fix data to include the current GNSS fix;

determine, based on the GNSS fix data, a short-term average of GNSS fixes;

determine, based on the GNSS fix data, a long-term average of GNSS fixes;

determine a difference between the short-term average of GNSS fixes and the long-term average of GNSS fixes;

determine that the difference satisfies a first threshold for at least a first duration;

determine, based on the current GNSS fix, a horizontal estimated position error (HEPE); and determine that the HEPE satisfies a second threshold for at least the first duration.

18. The non-transitory computer-readable medium of claim 17, wherein the first duration is 20 seconds.

19. The method of claim 1, wherein the first duration is 20 seconds.

20. The device of claim 9, wherein the first duration is 20 seconds.

* * * * *